United States Patent [19]
Pratt

[11] Patent Number: 6,048,426
[45] Date of Patent: Apr. 11, 2000

[54] METHOD OF MAKING DAMPED COMPOSITE STRUCTURES WITH FIBER WAVE PATTERNS

[75] Inventor: William Fossum Pratt, Pleasant Grove, Utah

[73] Assignee: Brigham Young University, Provo, Utah

[21] Appl. No.: 08/970,141

[22] Filed: Nov. 14, 1997

Related U.S. Application Data

[60] Provisional application No. 60/030,989, Nov. 15, 1996.

[51] Int. Cl.[7] ........................................................ B32B 5/02
[52] U.S. Cl. .......................... 156/177; 156/179; 156/324; 156/440
[58] Field of Search ................................... 156/176, 177, 156/178, 179, 324, 440

[56] References Cited

U.S. PATENT DOCUMENTS

| | | | |
|---|---|---|---|
| 1,800,179 | 4/1931 | Darrow | 156/177 |
| 3,361,616 | 1/1968 | Scharf | 156/179 X |
| 3,937,559 | 2/1976 | Ferrentino et al. | 156/179 X |
| 4,084,029 | 4/1978 | Johnson et al. | |
| 4,734,146 | 3/1988 | Halcomb et al. | |
| 4,942,080 | 7/1990 | Heuel et al. | |
| 4,971,846 | 11/1990 | Lundy | |
| 5,009,732 | 4/1991 | Ikeda et al. | 156/179 X |
| 5,108,802 | 4/1992 | Sattinger | |
| 5,203,435 | 4/1993 | Dolgin | |
| 5,335,463 | 8/1994 | Reinhall | |
| 5,788,804 | 8/1998 | Horsting | 156/178 X |
| 5,863,368 | 1/1999 | Perrin | 156/177 |

FOREIGN PATENT DOCUMENTS 0 133 340  2/1985  European Pat. Off. .

OTHER PUBLICATIONS

Trego et al., "Reduced Boring Bar Vibrations Using Damped Composition Stucrtures" *Design Engineering Technical Conferences* vol. 3 Part A pp. 305–311 (1995).

Trego et al., "Optimization of Passively Damped Composite Structures" *International Journal of Modelling and Simulation* 17:No.4:284–287 (1997).

Trego et al., "Improved Axial Damping of Mechanical Elements Through the Use of Multiple Layered, Stress Coupled, Co–Cured Damped Fiber Reinforced Composited" *Journal of Advanced Materials* pp. 28–34 (1977).

"Composite Struts Would Damp Vibrations" *NASA* XP 000264118 15:718 (1991).

*Primary Examiner*—Sam Chuan Yao
*Attorney, Agent, or Firm*—Foley & Lardner

[57] ABSTRACT

A method and apparatus of manufacturing a composite material which is light weight and highly damped against vibration. The composite material comprises fibers embedded in a resin matrix wherein the fibers are oriented in a waveform that is substantially continuously variable as to period, amplitude and/or shape. A viscoelastic material is combined with the resin matrix to provide vibration dampening characteristics. The variation in the period/amplitude takes place in a region of the composite structure which is selected to provide optimum strength and dampening characteristics as desired for the particular application. Even without the viscoelastic material, the light weight structure is useful as a pre-preg material from which other composite structures may be formed. Methods of manufacturing the composite material include using multiple, identical cells in which each cell is used to fabricate a fiber, resin matrix and viscoelastic adhesive composite. Rollers, sprays or perforated roller techniques may be employed to lay down the various layers. During the fabrication process, plural pairs of pinch rollers, moving axially with respect to each other are used to lay down the fibers within the resin/viscoelastic composite in a waveform pattern having a variable and controllable period, amplitude and/or shape.

13 Claims, 14 Drawing Sheets

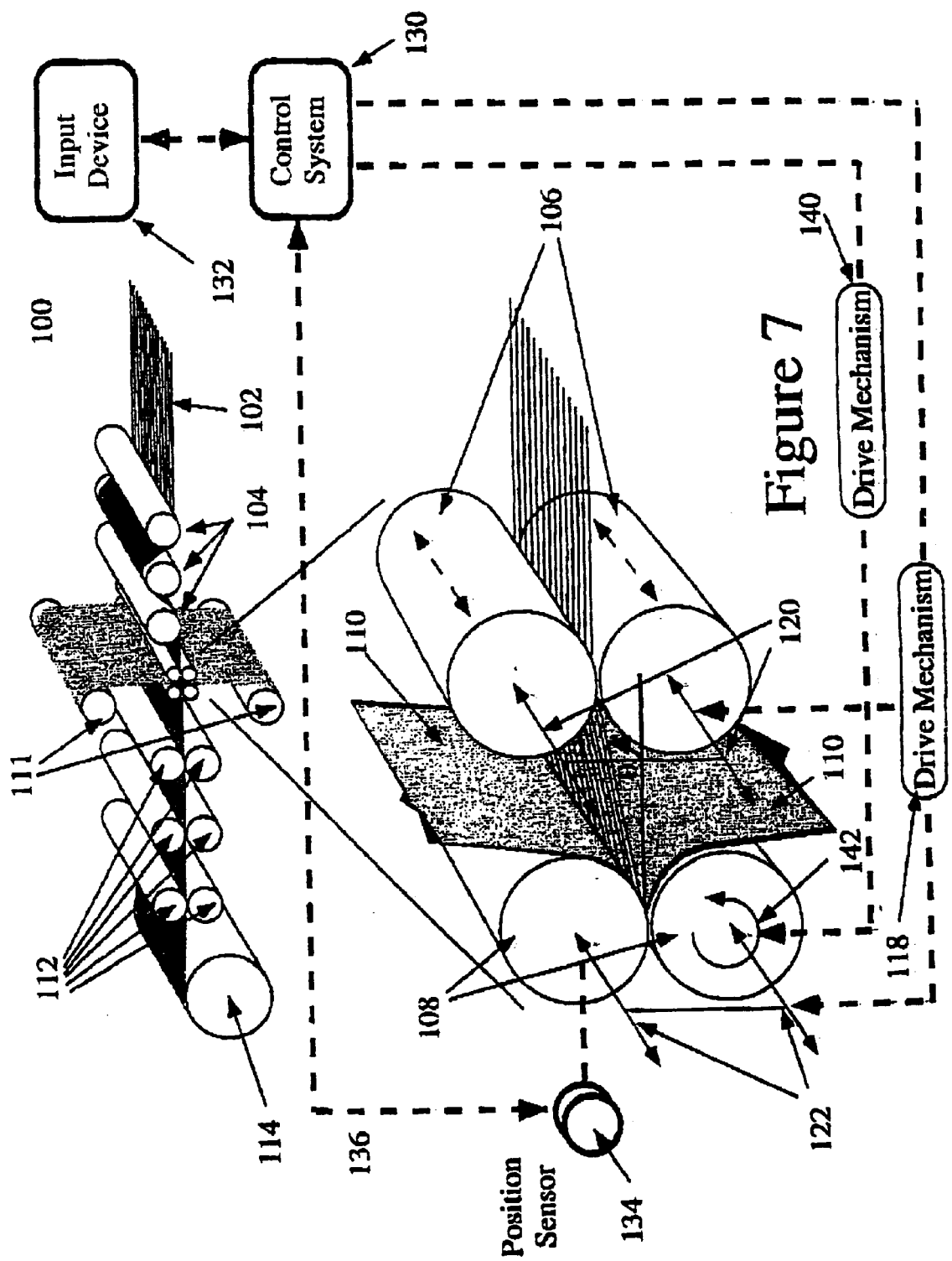

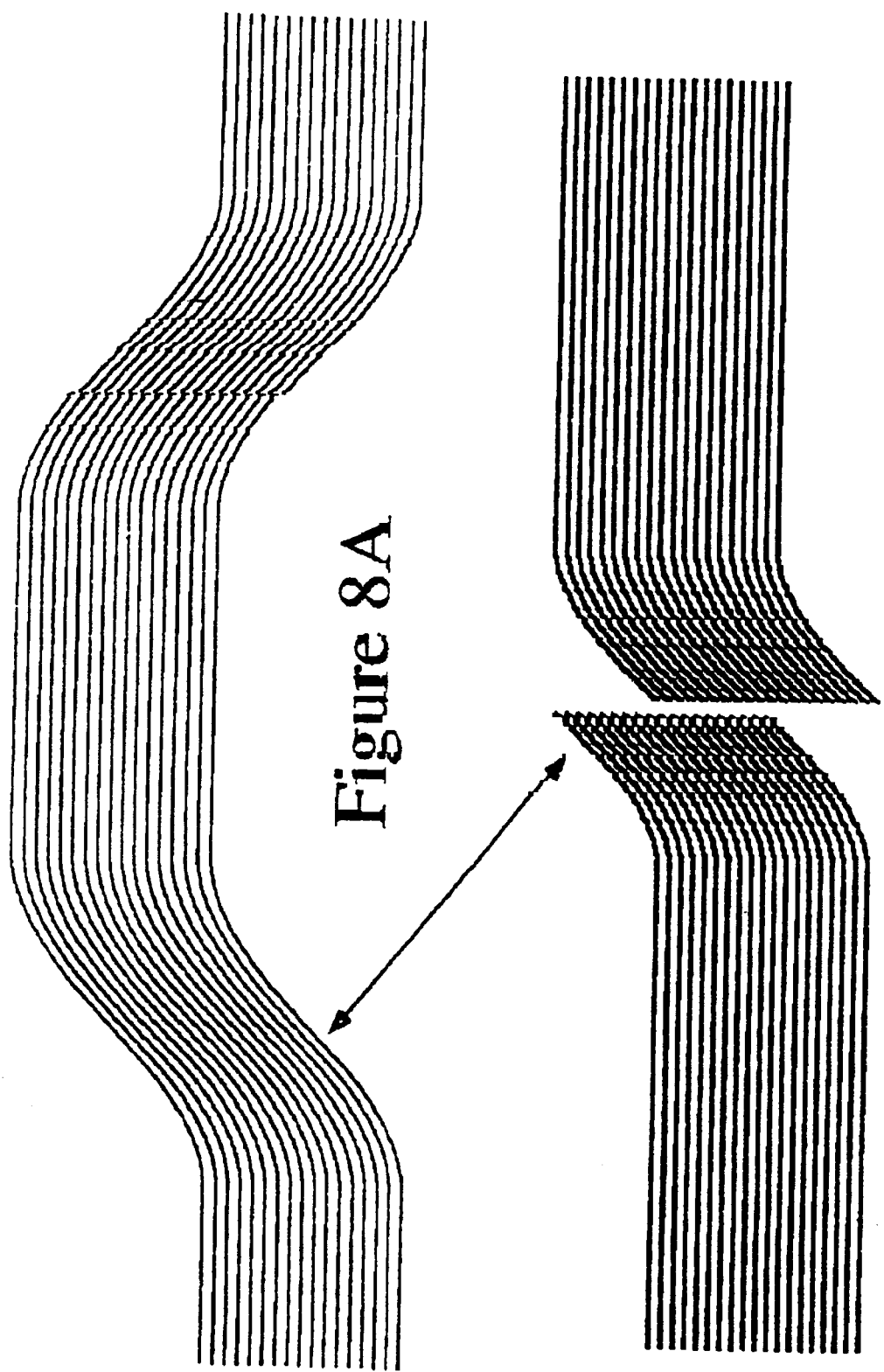

METHOD OF MAKING DAMPED COMPOSITE STRUCTURES WITH FIBER WAVE PATTERNS

CROSS-REFERENCES TO RELATED APPLICATIONS

This application claims the benefit of U.S. Provisional Application 60/030,989, filed Nov. 15, 1996. The whole of related PCT Publication WO 93/08023, published Apr. 29, 1993, is incorporated herein by reference.

STATEMENT OF U.S. GOVERNMENT INTEREST

This invention was made with Government support under grant No. DMI-9413808 awarded by the National Science Foundation. The Government has certain rights in this invention.

BACKGROUND OF THE INVENTION

1. Field of the Invention

The control of vibrations in composite structures is an important area of research in aerospace, automotive and other industries. For example, spacecraft vibrations initiated by altitude adjusting thrusters, motors and thermally induced stresses inhibit accurate aiming of antennas and other equipment carried by the craft. Such vibrations can cause severe damage to the craft and its associated equipment. Fatigue failure of structural components can occur at stresses well below static load limits.

Composite materials have been used to construct a wide variety of structural elements, including tubes, enclosures, beams, plates and irregular shapes. Objects as diverse as rocket motor housings and sporting goods, notably skis, archery arrows, vaulting poles and tennis rackets have been structured from composite materials. While composite constructions have offered many significant advantages, such as excellent strength and stiffness properties, together with light weight, the poor vibration damping properties of such constructions have been of concern.

The invention relates to composite material structures having increased damping with little or no sacrifice of structural stiffness or strength.

The invention also relates to the methods and apparatus for manufacturing the aforementioned composite material structures.

Another aspect of the invention is directed toward the fabrication of a wavy fiber pregreg (fibers preimpregnated with epoxy resin). Such prepregs not only have an aesthetic appeal but also may be fabricated with selected variable volume fractions to accommodate a variety of applications.

2. Description of Related Art

The following terms used herein will be understood to have their ordinary dictionary meaning as follows:

Fiber: a thread or a structure or object resembling a thread.
  a slender and greatly elongated natural or synthetic filament. (This definition includes metal fibers).

Matrix: material in which something is enclosed or embedded.

Viscoelastic: having appreciable and conjoint viscous and elastic properties.

Lamina(e): a thin plate . . . : LAYER

Composite: made up of distinct parts.

It may be further helpful to note the definitions of $G^0$ and $G^1$ geometric continuity. "If two curve segments join together, the curve has $G^0$ geometric continuity. If the directions (but not necessarily the magnitudes) of the two segments' tangent vectors are equal at a join point, the curve has $G^1$ geometric continuity. $G^1$ continuity means that the geometric slopes of the segments are equal at the join point." Foley et al. *Computer Graphics Principles and Practice*, Addison-Wesley, 1996, p. 480.

The article "Understanding Vibration Measurements," George F. Lang, Sound and Vibration, March, 1976, p. 26, presents a generally accepted mathematical treatment of the vibration of mechanical structures under environmental loading. This treatment applies generally to composite structures, and is incorporated by reference for purposes of this disclosure for its explanation of the amplification factor Q and its relationship to the viscous damping factor $\zeta$. The "loss ratio" referred to in this disclosure is twice the viscous damping factor as defined by Lang.

Conventional methods used to control the often destructive levels of vibration take many forms, from simple passive treatments to extensive redesign of structures. One of the simplest and often most effective passive damping treatments involves the use of thermo-visco-elastic (TVE) materials. TVE materials such as 3M's Scotchdamp series (ISD-112 is one example), exhibit dissipative qualities which make them useful in a number of passive damping treatments. Some of the first uses of TVE materials to increase structural damping involved the use of surface patches of aluminum foil and viscoelastic adhesives. These conventional approaches to surface damping treatments are called constrained or embedded-layer damping, and produce modest gains in damping over undamped structures.

One of the more common passive damping methods, "constrained layer damping" or CLD is discussed in the article "Damping of Flexural Waves by a Constrained Viscoelastic Layer," Kerwin, Journal of the Acoustical Society of America, 1959, Vol. 31, Issue 7, pp. 952–962. According to Kerwin, CLD is achieved by bonding a thin layer of metal sheet, usually aluminum, to an existing structure with a viscoelastic adhesive. According to this technique, damping material, typically a viscoelastic material, is applied to the surface of a composite structure, such as an airplane wing. The damping material is sandwiched between the composite surface and a rigid layer, such as a thin aluminum sheet. This approach has generally been remedial in character and is accomplished at the sacrifice of other considerations, such as weight, aesthetics and ideal surface configuration. Shear strains are developed in the viscoelastic material when the original structure bends or extends. Damping occurs when the deformation of the viscoelastic adhesive creates internal heat in the viscoelastic material and dissipates energy.

Compared to an undamped structure, this approach is modestly successful but its effectiveness decreases markedly as the ratio of the thickness of the base structure to the thickness of the viscoelastic material increases. Thus, surface treatments alone cannot provide significant levels of damping to structural members where greater strength and stiffness are important. In the article "Use of Strain Energy Based Finite Element Techniques in the Analysis of Various Aspects of Damping of Composite Materials and Structures," Hwang, et al., Journal of Composite Materials, 1992, Vol. 26, Issue 17, pp. 2585–2605, this problem was reported, and it showed that the advantage of aluminum foil viscoelastic constrained layer damping was eclipsed by the inherent damping in conventional composites when the required thickness of the structure exceeded about three tenths of an inch. The authors determined that a ±45° graphite/epoxy composite provided approximately uniform damping of about 1.5% in thick sections.

It is known that laminated beams composed of alternating layers of elastic and viscoelastic materials can dissipate vibratory energy while maintaining a degree of structural integrity. The article "Composite Damping of Vibrating Sandwich Beams," DiTaranto, et al, Jour. of Engineering for Industry, Nov., 1967, p. 633, presents a theoretical description of such structures.

The feasibility of co-curing embedded layers of damping materials in a composite structure has been demonstrated. See, for example, Rotz, Olcott, Barrett, "Co-cured Damping Layers in Composite Structures," *Proceedings 23rd International SAMPE Technical Conference*, Vol. 23, pp. 373–387, 1991. Vibration control can thus be designed into a structure prior to its actual construction. Composite tubes have been constructed from a pair of concentric composite stiffness layers, the annular space between them being occupied by a damping layer. It is known that when fiber-reinforced materials are loaded along any axis not parallel or perpendicular to the fibers, shear deformations are induced. A tube with plies oriented "off-axis" (with respect to the central axis of the tube) will twist when loaded axially. With the plies of the two stiffness layers oriented at opposite but similar angles with respect to the tube axis, intense shear deformation is induced in the damping layer when the tube is loaded axially. The stiffness of the tube remains high because the load passes only through the stiffness layers, and the damping layer adds little weight to the structure. Unfortunately, the most significant shear displacements occur at the free ends of the tube. Constraining the rotational deformations of the stiffness plies at either end of the tube eliminates any shear deformations in the damping layer at that end, thereby reducing the damping effect of the system. Complicated end fixtures are thus required to allow the requisite free end displacements while still transmitting axial loads.

Stress-coupled co-cured composite viscoelastic structures are formed when layers of uncured fiber composites and TVE materials are alternately stacked together and co-cured in an oven. These structures provide impressive levels of damping and can be categorized by the fiber orientation methods used to induce damping in the TVE material.

The article "A Design for Improving the Structural Damping Properties of Axial Members," Barrett, Proceedings of Damping, 1989, Vol. HBC-1–18, proposed designs using conventional angled-ply (±θ) composite lay-ups of straight fiber pre-preg materials (e.g., fabric layers preimpregnated with resin material). Barrett used the inherent shear coupling properties of composite materials to design damped composite tubular components which would induce significant damping in the structure. Fiber-reinforced composites will shear as the fibers attempt to align themselves with the applied loads when these loads are not parallel or perpendicular to the fiber. Because of this behavior, a plate constructed with a positive θ fiber layer, a viscoelastic material layer, and a negative θ fiber layer will generate large shear strains (γ) in the TVE material when an axial load is applied to the tube. Barrett's research showed that maximum shearing was experienced at the ends of the tubes. However, connections at the tube ends eliminated much of the damping effect, rendering the design impractical for many applications.

U.S. patent application Ser. No. 07/780,923 to Olcott et al., filed Oct. 22, 1991, proposes "stress coupled damping" (SCD) which also uses conventional angled ply (±θ) composite lay-ups of straight fibers, but abruptly changes the fiber orientation several times throughout the structure. According to Olcott et al., each composite layer is comprised of multiple segments of pre-preg composite material. The patent teaches the use of adjacent segments, having fibers therein which cumulatively form a chevron pattern. The composite layer may include several pre-preg plies in which the segments are staggered or overlapped to strengthen the joint. This creates a region in the composite layer that exhibits quasi-isotropic properties.

By selecting the fiber angle, thickness, and segment lengths, significant shearing in the viscoelastic layers was observed over the entire structure, not just at the ends as in Barrett's design. As a result, the structure retained high stiffness and exhibited improved damping even when the ends were clamped. The following publications, incorporated herein by reverence, are cited for further details on this subject.

1. Olcott, D. D., "Improved Damping in Composite Structures Through Stress Coupling, Co-Cured Damping Layers, and Segmented Stiffness Layers," Brigham Young University, Ph.D. Thesis, August 1992.

2. Trego, A., Eastman, P. F., Pratt, W. F., and Jensen, C. G., "Reduced Boring Bar Vibrations Using Damped Composite Structures," *Proceedings of the* 1995 *Design Engineering Technical Conferences*, Vol. 3, Part A, pp. 305–311.

3. Trego, A. and Eastman, P. F., "Optimization of Passively Damped Composite Structures," *International Journal of Modelling and Simulation*, Vol. 17, No, 4, 1997;

4. Trego, A., Olcott, D. D., and Eastman, P. F., "Improved Axial Damping of Mechanical Elements Through the Use of Multiple Layered, Stress Coupled, Co-Cured Damped Fiber Reinforced Composites", *Journal of Advanced Materials*, January, 1977, p.28.

The text *Vibration Damping of Structural Elements*, by C. T. Sun and Y. P. Lu, Prentice Hall PTR, 1995, presents a discussion of fiber reinforced damping in composite materials using viscoelastic materials for damping, and is incorporated herein by reference.

Although damping was improved, such structures manufactured by conventional lay-ups of straight fiber segments were time consuming to make, error prone, and could not be readily automated. The use of composite struts to dampen vibrations has been proposed in U.S. Pat. No. 5,203,435 to Dolgin. According to Dolgin, plies with opposing chevron patterns of fibers would convert longitudinal vibrational stresses into shear stresses in an intermediate viscoelastic layer which would then dissipate the vibrational energy. One specific structure proposed is a tube with an inner ply oriented at 0°, a second layer oriented at +45°, a central viscoelastic layer, a subsequent layer oriented at −45°, and an outer layer oriented at 90°. Dolgin also illustrates a sinewave pattern. The disclosure of the Dolgin patent is incorporated herein by reference.

The materials, methods and applications of composites manufacturing are set forth in detail in the literature. An exemplary source for information of this kind is the textbook "FUNDAMENTALS OF COMPOSITES MANUFACTURING" by A. Brent Strong, published by The Society of Manufacturing Engineers, Dearborn, Mich., 1989. The disclosure of this textbook is incorporated herein by reference for its explanation of the art of composites manufacturing as it is currently practiced. Similarly, the textbook "VISCOELASTIC PROPERTIES OF POLYMERS," John D. Ferry, Wiley, N.Y., (3rd Ed., 1980) presents a thorough summary of the nature, behavior and identity of typical materials which may be selected by composites technicians for use as damping materials. A good discussion of viscoelasticity as it applies to materials of interest to this disclosure is presented in the publication "Linear Viscoelasticity, Driscoll, et al., available from the Structural Products Department of 3M Company, St. Paul, Minn.

There remains a need for a composite structure capable of diverse configuration with improved damping characteristics and which avoids the limitations of the structural approaches heretofore suggested for use with composites materials.

SUMMARY OF THE INVENTION

The present invention is directed to "continuous wave composite viscoelastic" (CWCV) structures, as well as the methods and apparatus of manufacturing them.

The invention is also directed to a CWC (continuous wave composite) which forms a continuously wavy prepreg for use with or without a separate viscoelastic layer.

In both the CWCV and CWC structures, the wavy characteristic of the fiber is optimally varied in at least one of a period, amplitude or shape characteristic.

In accordance with another aspect of the invention, there is provided a fiber reinforced viscoelastic tape which may be used in many diverse applications.

The lay of fiber in a CWCV composite layer is varied continuously in a periodic wavelike form. A simple sinusoid wave form may be used, however, other wave forms which may or may not be periodic may also be used. It is also envisioned to employ an optimal wave form for damping particular vibration frequencies at particular locations of a structure.

The terminology CWC (continuous wave composite) will be used to defined any fiber-matrix combination having at least one fiber without a break (or interruption) and having a pattern which can be defined by a mathematical algorithm. Typically, such curves have $G^1$ geometric continuity. A fourier series expansion is a mathematical algorithm which can, in general, be used to define nearly any desired shape such as pseudo random, square wave, straight line, triangular wave or any of the shapes shown in FIGS. 1–6 below.

The terminology CWCV (continuous wave composite viscoelastic) will be used to defined a composite structure which uses at least one layer of CWC material having viscoelastic properties (or anisotropic viscoelastic'); or at least one layer of CWC material combined with at least one layer of viscoelastic material either in a sandwich construction or adjacent construction.

A CWCV is defined by specifying the angle of the fiber lay along the composite layers (e.g. the orientation angles of the fiber with respect to the loading direction), the thickness of the composite layers, and the number of composite and viscoelastic layers in the structure.

The ends of a CWCV structure according to the present invention may be restrained without significantly reducing the overall damping properties of the structure. There results a structural element possessing high axial stiffness and low weight. The structural elements of this invention offer markedly superior damping capabilities but are nevertheless useable with simple attachment fixtures and methods.

The composite structures of this invention may take a variety of forms, including tubes, plates, beams or other regular or irregular shapes. In any event, a typical structure will at a minimum include a first stiffness layer or matrix, a damping material, and a second stiffness layer or matrix. Each stiffness layer or matrix will include at least one reinforcing fiber and will be at least several thousandths of an inch thick. Layers with multiple plies and of much greater thickness; e.g. several inches, are envisioned. The fibers of a multi-ply layer may be of similar or dissimilar orientation. The damping material may be of any appropriate thickness, depending upon the application involved, as well as the properties of the damping material selected. The damping material may comprise another layer interposed between the stiffness layers, or may be incorporated into the stiffness layer. Typically, the damping material will be as thin as is practical, to avoid adding excess weight to the structure. It is not unusual, however for a layer of damping material to exceed in thickness the total thickness of the stiffness layers. The stiffness layers may be constructed of any of the reinforcing fibers and matrix materials which would otherwise be appropriate for a particular application. The damping material will ordinarily be selected to provide optimum damping loss at the temperatures and vibrational frequencies expected to be encountered by the composite structure.

With two stiffness layers, shear strain occurs between the two stiffness layers, e.g. in an intermediate damping layer. Other embodiments contemplate the use of multiple damping layers. For example, the use of three stiffness layers permits the exercise of two intermediate damping layers, with greater damping effect. The stiffness layer may be combined with the damping layer by utilizing a viscoelastic material as all or a portion of the impregnating resin. Co-curing of the stiffness and damping layers simplifies the construction of both complex structures and structural components.

One embodiment of the invention may be characterized as a structure for use as a pre-preg comprising a fiber tow, and a resin matrix containing the fiber tow, wherein the fiber tow is held in the resin in a waveform varying in at least one of a period, amplitude or shape characteristic. The prepreg may be utilized as at least part of a support structure and in such a case, the fiber tow may have a first waveform characteristic selected to dampen a first vibration mode of the support structure and a second waveform characteristic, superimposed on the first waveform, wherein the second waveform characteristic is selected to dampen a second vibration mode of the support structure. The first waveform characteristic may be one of a period and amplitude characteristic and the second waveform characteristic may also be one of a period and amplitude characteristic.

Another embodiment of the invention may be characterized as a structure comprising a fiber tow, a resin matrix containing the fiber tow, and a viscoelastic material adjacent to or contacting the fiber tow, wherein the fiber tow is held in the resin in a waveform varying in at least one of a period, amplitude or shape characteristic.

Another embodiment of the invention may be characterized as a material for damping vibration, the material having a loading direction and comprising a first matrix containing a first set of fibers, the first set of fibers having a first waveform varying in at least one of a period, amplitude or shape characteristic along the loading direction; a second matrix containing a second set of fibers, the second set of fibers having a second waveform; and an viscoelastic material positioned between the first matrix and the second matrix. The first and second waveforms may be different from one another, and they may differ only in their phase angle relative to one another. Further, the second waveform may vary in at least one of a period, amplitude or shape characteristic along the loading direction, and at least one of the first and second sets of fibers may be at least partially contained within the viscoelastic material. The fibers of the first and second sets may be relatively oppositely oriented along the loading direction.

The CWC material is also characterized in that the volume fraction changes in such a way that the first set of fibers comprises a plurality of first fibers relatively laterally spaced with respect to the loading direction, wherein the relative lateral spacing is inversely proportional to the angular orientation with respect to the loading direction.

Another embodiment of the invention may be characterized as a method of fabricating an impregnated material comprising the steps of (a) passing a plurality of fibers to at least one first roller, the first roller contacting the plurality of fibers for moving same along a first direction, (b) passing the plurality of fibers to at least one second roller, the second roller contacting the plurality of fibers for moving same along the first direction, (c) transversely relatively moving at least one of the first and second rollers in a second direction while each of the first and second rollers contacts the plurality of fibers thereby moving the plurality of fibers generally perpendicular to the first direction, and (e) applying a carrier to the fibers as the fibers pass proximate the second roller.

The applying step may comprise applying an uncured polymer matrix to the fibers as the fibers pass proximate the second roller.

The applying step may comprises applying a viscoelastic material to the fibers as the fibers pass proximate the second roller.

The step of transversely relatively moving set for above may comprises utilizing a controller to generate control signals according to a desired waveform for the fibers, feeding the control signals to a device for relatively moving the at least one of the rollers with respect to the other of the rollers in the second direction to thereby cause the shape of the fibers to conform to the desired waveform. The controller may comprise an electronic controller and the control signals may comprise electronic control signals which generate a waveform varying in at least one of a period, amplitude or shape characteristic. The step of applying the resin material may include spraying a resinous material onto the fibers or passing a support member carrying resinous material on at least one side of the fibers prior to the fibers making contact with the second roller to thereby impregnate the fibers with the resinous material, and subsequently separating the support member from the fibers.

Another embodiment of the invention may be characterized as a method of fabricating a material comprising the steps of a. passing a plurality of fibers to at least one first roller, the first roller contacting the plurality of fibers for moving same along a first direction, b. passing the plurality of fibers to at least one second roller, the second roller contacting the plurality of fibers for moving same along the first direction, c. transversely relatively moving at least one of the first and second roller in a second direction while each of the first and second rollers contacts the plurality of fibers thereby moving the plurality of fibers generally perpendicular to the first direction, d. applying a resin matrix to the fibers as the fibers pass proximate the second roller, and e. positioning a viscoelastic material at least adjacent the fibers. The positioning of the viscoelastic material may include commingling the viscoelastic material with the fibers and may be performed after the resin matrix applying step. The positioning step may include applying the viscoelastic material to the fibers at the same time as applying the resin matrix.

Transversely relatively moving the rollers may be achieved by utilizing an electronic controller to generate control signals according to a desired waveform for the fibers, and feeding the control signals to a device for relatively moving the at least one of the rollers with respect to the other of the rollers in the second direction to thereby cause the shape of the fibers to conform to the desired waveform.

Yet another embodiment of the invention is characterized as tape comprising a fiber tow, and a viscoelastic material containing the fiber tow. The viscoelastic material may be uncured or cured. Typically, the tow is orientated in substantially a straight line parallel to the direction of longitudinal axis of the tape. However, the tow may also form a sinusoidal waveform or a waveform that varies in one of a period, amplitude or shape characteristic along the longitudinal axis of the tape.

Yet another embodiment of the invention may be characterized as a composite structure comprising a first fiber tow, a resin matrix containing the fiber tow, a second fiber tow, a viscoelastic material containing the second fiber tow, the resin and viscoelastic material positioned adjacent one another. Typically at least one of the fiber tow of the matrix and the fiber tow of viscoelastic material has a waveform characteristic selected to dampen the at least one vibrational mode of a support structure. The fiber tow of the matrix may have a first waveform characteristic and the fiber tow of the viscoelastic material may have a second waveform characteristic, different from the first waveform characteristic. The first and second waveform characteristics may have opposite phases from one another. Further, at least one waveform may have a waveform characteristic variable in at least one of a period, amplitude or shape characteristic along the longitudinal direction of the composite structure.

In use, the composite structure comprising the resin and viscoelastic material are positioned adjacent an isotropic structure, the isotropic structure forming at least a part of a support structure. The composite structure dampens at least one vibrational mode of the support structure.

Yet another embodiment of the invention may be characterized as a method of applying a strengthening layer to a workpiece comprising the steps of wrapping a fiber tow about at least a portion of the workpiece, the fiber tow serving a strengthening layer, and subsequently applying a fiber re-enforced viscoelastic tape about at least the portion to secure the fiber tow to the workpiece.

Another embodiment of the invention may be characterized as a method of applying a strengthening layer to a workpiece comprising the steps of wrapping a fiber tow about at least a portion of the workpiece, the fiber tow serving a strengthening layer, and subsequently securing the fiber tow to at least the portion of the workpiece, wherein the step of wrapping the fiber tow includes the step of applying the fiber tow to the workpiece so as to take the shape of a desired non-spiral waveform. The step of securing the fiber tow may include applying a viscoelastic tape to the portion of the workpiece or applying a resinous material to the portion of the workpiece. Further, the applying step may include applying the fiber tow to the workpiece so as to take the shape of a sinusoidal waveform.

Yet another embodiment of the invention may be characterized as a method of applying a strengthening layer to a workpiece comprising the steps of wrapping a fiber tow about at least a portion of the workpiece, the fiber tow serving a strengthening layer, and subsequently securing the fiber tow to at least the portion of the workpiece, wherein the step of wrapping the fiber tow includes the step of applying the fiber tow to the workpiece so as to have a waveform characteristic varying in at least one of a period, amplitude or shape characteristic.

Yet another embodiment of the invention may be characterized as an apparatus for controlling the fiber angle of a fiber tow embedded in a carrier comprising:

a first pair of rollers including a first and second roller, at least a third roller, the fiber tow pressed between the first and second rollers and contacting the third roller for movement along a first direction due to rotation of the first, second and third rollers, a first drive mechanism for rotating the first, second and third rollers, a second drive mechanism connected to at least one of the first pair of rollers and the third roller, the second drive mechanism responsive to control signals for displacing the at least one of the first pair of rollers and the third roller axially along the rotation axis of the at least one of the first pair of rollers and the third roller, and an electronic controller connected to the second drive mechanism for generating the control signals to control the amount of axial displacement of the at least one of the first pair of rollers and the third roller.

The electronic controller may comprise a digital computer programmed to generate the control signals as a function of at least one of distance along the first direction and time. Further, the carrier may comprises a matrix material in the form of a rolled sheet and the apparatus further comprises at least one support roller for securing the matrix material, the at least one support roller positioned for feeding the matrix material for contact with the third roller together with the fiber tow for at least partially securing the fiber tow in place within the matrix material.

The apparatus may further comprise:

a fourth roller positioned adjacent the third roller to form a second pair of rollers, the fiber tow passing between the third and fourth rollers, at least a first and second support roller and a first and second sheet of matrix material, the first support roller supporting the first sheet of matrix material and the second support roller supporting the second sheet of matrix material, and the first support roller positioned for feeding the matrix material of the first sheet between one of the third and fourth rollers and the fiber tow, and the second support roller positioned for passing the matrix material of the second sheet between the other of the third and fourth rollers and the fiber tow.

The matrix material may comprises an uncured polymer, a metal matrix or a ceramic matrix.

The apparatus may further comprise heating elements downstream of the second pair of rollers, in reference to the first direction, for causing wicking of the fibers with an uncured polymer matrix.

The carrier may comprise a viscoelastic material in the form of a rolled sheet and the apparatus may further comprise at least one support roller for securing the viscoelastic material, the at least one support roller positioned for feeding the viscoelastic material for contact with the third roller together with the fiber tow.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiments of the invention, and, together with the general description given above and the detailed description of the preferred embodiments given below, serve to explain the principles of the invention.

FIG. 7 is a schematic illustration of an apparatus according to the present invention for manufacturing a composite material.

FIGS. 8A and 8B are illustrations of bent fibers showing how the volume fraction is enhanced with the use of bending.

DESCRIPTION OF THE PREFERRED EMBODIMENTS

According to one aspect of the invention, a particular wave fiber pattern reinforces a matrix in such a way that wave patterns from two collateral CWC laminae act in a shearing manner on a sandwiched viscoelastic adhesive. When axial or in-plane shear forces are imposed upon this combination, enhanced shearing is induced in the viscoelastic adhesive producing an unexpected increase in structure damping.

Figure 1:
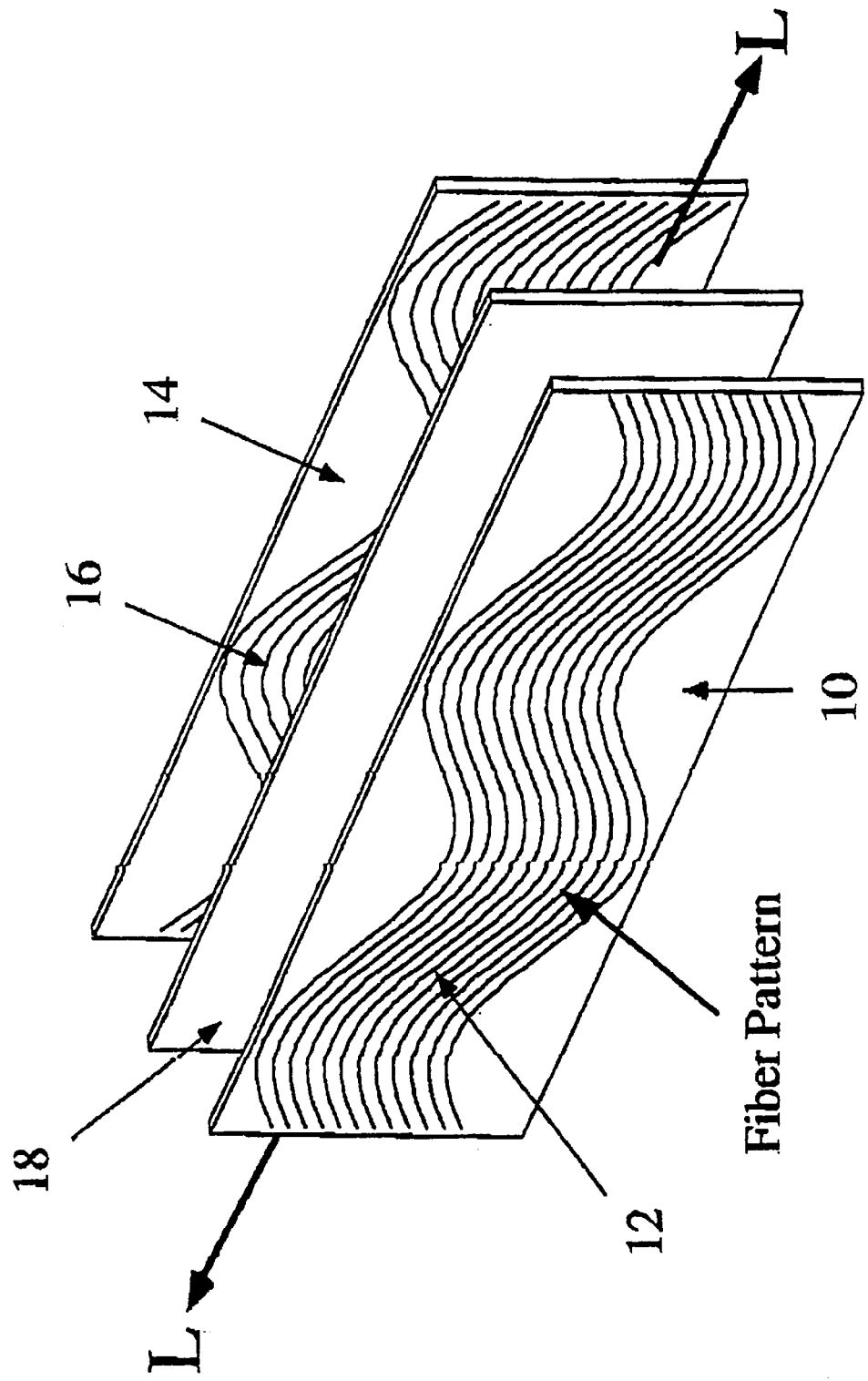
FIG. 1 is an exploded perspective view of a composite material according to a generalized embodiment of the present invention.

As shown in FIG. 1, a first matrix 10 contains a pattern of reinforcing fibers 12, and a second matrix 14 contains a pattern of reinforcing fibers 16. A viscoelastic material such as an adhesive is interposed therebetween and secures the first and second CWC lamina 10,14 to one another.

The number and pattern of the fibers 12,16 illustrated in the figures is exemplary. More or less fibers in any desired pattern are envisioned.

In FIG. 1, a generally sinusoidal shaped fiber pattern is contained by both CWC lamina 10,14; however, the patterns as illustrated are opposite with respect to the direction of loading L. In particular, at any given point along the loading direction L, the angle of orientation of fibers 12 with respect to the loading direction L has the same magnitude and the inverse sign of the angle of orientation of fibers 16 with respect to the loading direction L.

Figure 2:
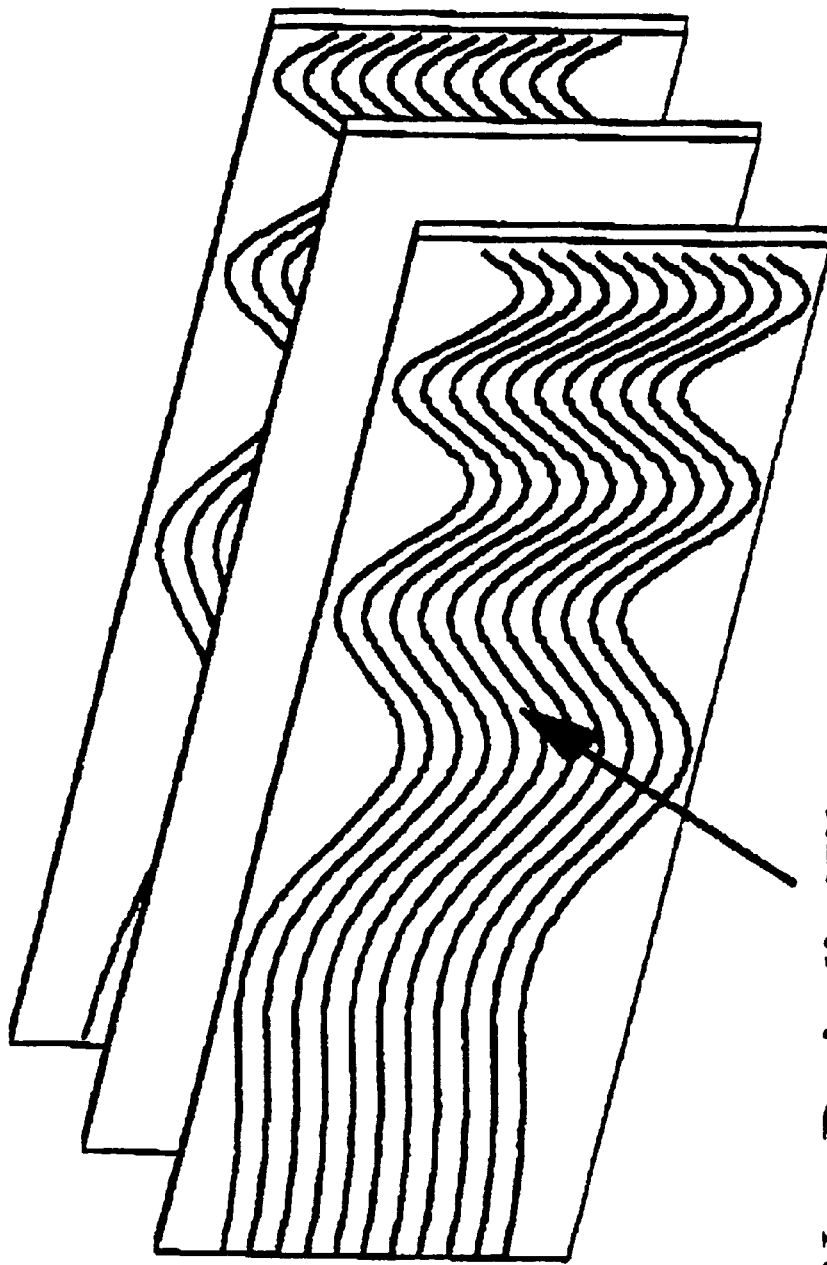
FIG. 2 is an exploded perspective view of a composite material according to an alternate embodiment of the present invention.

The invention also includes fiber patterns which change their wavelength and/or waveform along the loading direction. The inventors have discovered that for a given frequency and temperature many viscoelastic adhesives will require an optimal wavelength to maximize damping in the structure. While a structure with a constant wavelength can be optimized for a given frequency and/or temperature, placement of a changing wavelength or waveform can optimize a structure for a broader range of frequencies and/or temperatures. This concept is illustrated in FIG. 2.

Stress coupled composite structures having one fiber angle at any given point along the loading direction are not able to withstand as much stress as one having multiple angles contained within a matrix. This is because failures occur in composite materials starting at areas of maximum in-plane shear stress in the composite layer, and propagate in the matrix material along the fiber direction.

Figure 3:
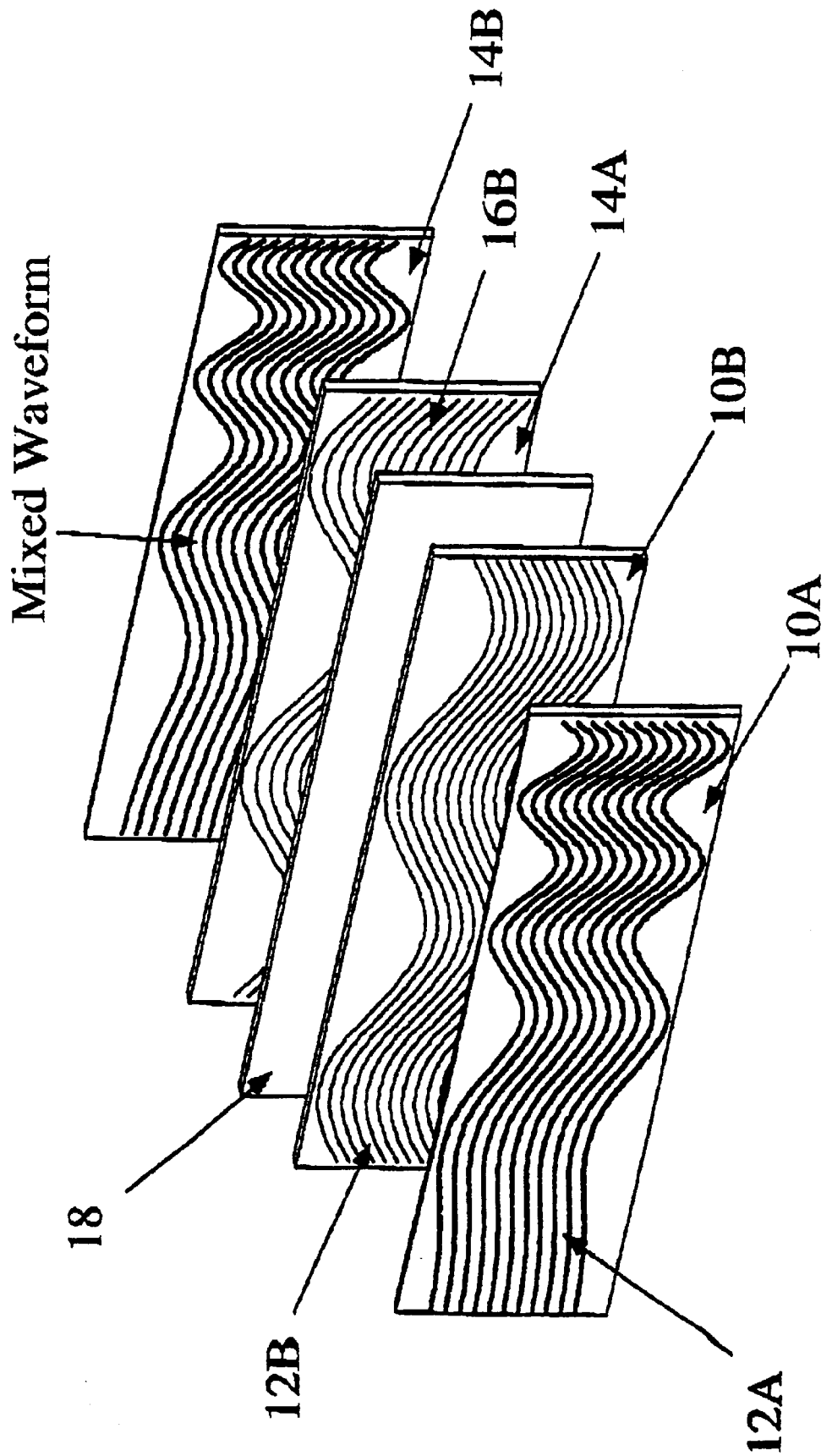
FIG. 3 is an exploded perspective view of a composite material according to another alternate embodiment of the present invention.

Although shear stress gradients in continuous wave stress coupled composites are lower than straight fiber chevron patterns, the use of different patterns overlaid on each other increases the ultimate strength of the structure. An alternate embodiment of the present invention shown in FIG. 3 illustrates matrix 10A containing fibers 12A in a first wave pattern and matrix 10B containing fibers 12B in a second wave pattern. Similarly, matrix 14A contains fibers 16A in an opposite wave pattern to fibers 12A and matrix 14B contains fibers 16B in an opposite wave pattern to fibers 12B.

Figure 4:
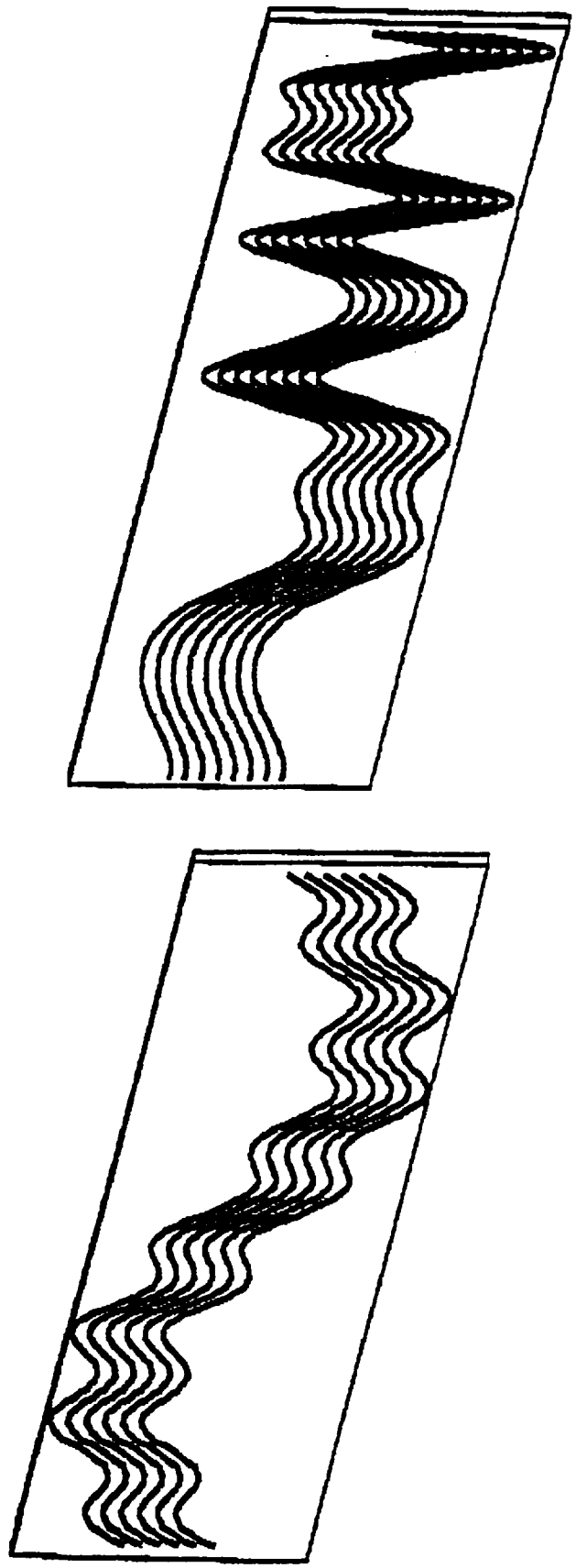
FIG. 4 is a perspective view illustrating two examples of matrices according to yet another embodiment of the present invention.

The present invention further envisions complex fiber patterns, such as those shown in FIG. 4, generated by an algorithm for optimizing pattern and/or shape, wave period, wave amplitude, structural stiffness, and structural damping. Using techniques similar to electronic signal processing, wave forms can be generated algorithmically which vary wave patterns by mixing two or more algorithmically defined waves with one or more differences in shape, period, amplitude, etc. For example:

A period modulated wave shape where two or more waves of differing period with or without the same amplitude, combined into one composite shape. This could be used to optimize damping and/or stiffness in complex structures where modal vibration and/or forcing functions require special design considerations.

An amplitude modulated wave shape could be used to modify stiffness and damping properties at varying positions in the structure.

A wave shape composed of two or more similar or dissimilar wave forms of different periods such that the combined wave form shows a mixed characteristic of all such combined waves. This would allow tailoring of structural properties for multiple modes and forcing functions.

A bessel based wave shape, a fourier series driven shape, sawtooth, trapezoidal, square wave, and modulated (by other similar or dissimilar wave forms) patterns.

Optimized patterns not necessarily algorithmically driven which are tailored by an optimization program to provide special structural response characteristics.

Random and/or neo-random patterns, and patterns which are a mixture of random or neo-random and periodic wave shapes.

A structure which uses conventional straight fiber composites to constrain an anisotropic viscoelastic material.

In the case of utilizing two or more different wave lengths for constructing the waveform, one may look at a cantilevered structure by way of example. It is known that the prediction of the resonant frequency of a cantilevered structural element (such as a diving board, robotic sliding arm, etc.) is given by the formula:

$$f_r = \frac{\lambda^2}{2 \cdot \pi \cdot L^2} \sqrt{\frac{E_{11} \cdot I}{\rho \cdot A}} \quad \text{where } \lambda_1 = 1.88; \lambda_2 = 4.7; \text{etc}$$

where lamda is the mode shape factor, L is the length, $E_{11}$ is the equivalent elastic modulus of the long axis, I is the section modulus, rho is the density, and A is the cross sectional area of the cantilevered element. In CWCV structures $E_{11}$ is a function of both the constraining composite layer and the viscoelastic properties of the damping layer. Since both the elastic and damping properties of the viscoelastic material are frequency and temperature dependent, then by extension, the elastic and damping properties of $E_{11}$ are also functions of the frequency and temperature.

It has been shown that higher frequency resonances or forcing functions require shorter wave periods for optimization of damping in CWCV structures. See, for example, the following publications incorporated herein by reference:

1. Pratt, W. F., Rotz, C. A. and Jensen, C. G. 1996 "Improved Damping and Stiffness in Composite Structures Using Geometric Fiber Wave Patterns," *Proceeding of the ASME Noise Control and Acoustics Division*, Vol. NCA 23-2, pp. 37–43.

2. Pratt, W. F., Rotz, C. A., and Jensen, C. G., 1996, "On the Use of Continuous Wave Composite Structures in Stress Coupled Interlaminar Damping," *Advanced Materials: Development, Characterization Processing, and Mechanical Behavior Book of Abstracts*, Vol. MD 74, pp. 63–64.

3. Pratt, W. F., Rotz, C. A., and Jensen, C. G., 1996, "On the Use of Continuous Wave-like Geometric Fiber Patterns in Composite Structures to Improve Structural Damping," *Proceedings of the ASME Aerospace Division*, Vol. AD 52, pp. 415–433.

Therefore a cantilevered structure that is design to vary its length would require a wave form of variable period to optimize its damping such as shown, for example in FIG. 2.

As an example, if a diving board was shortened to half its length, the resonant frequency would be quadrupled. This would shorten the optimal wave period. In like manner, a cantilevered robotic arm whose length was variable would require a wave period that would be continuously variable as well. Since most of the strain energy is concentrated at the root of the element, a continuously variable wave period would more readily optimize damping in the structure. FIG. 2 is an example of a continuously variable wave period.

As a second example, suppose the cantilevered beam was not variable in its length but two separate forcing frequencies were applied to the structure that were close to the natural frequencies of the 1st and 2d modes (lambda for the first two modes is given above). The resonant frequency for the 2d mode would be more than six times that of the primary or first mode. Optimization of damping in the beam for the first mode would require a long wave pattern (using a simple sinusoidal wave as an example). While the longer wave length would have some damping benefit for the 2d vibration mode, a shorter wave length would provide greater damping. In this case two waves, each of fixed but different frequencies but superimposed upon each other, similar to that shown in FIG. 4, would optimize damping for both modes.

Figure 5:
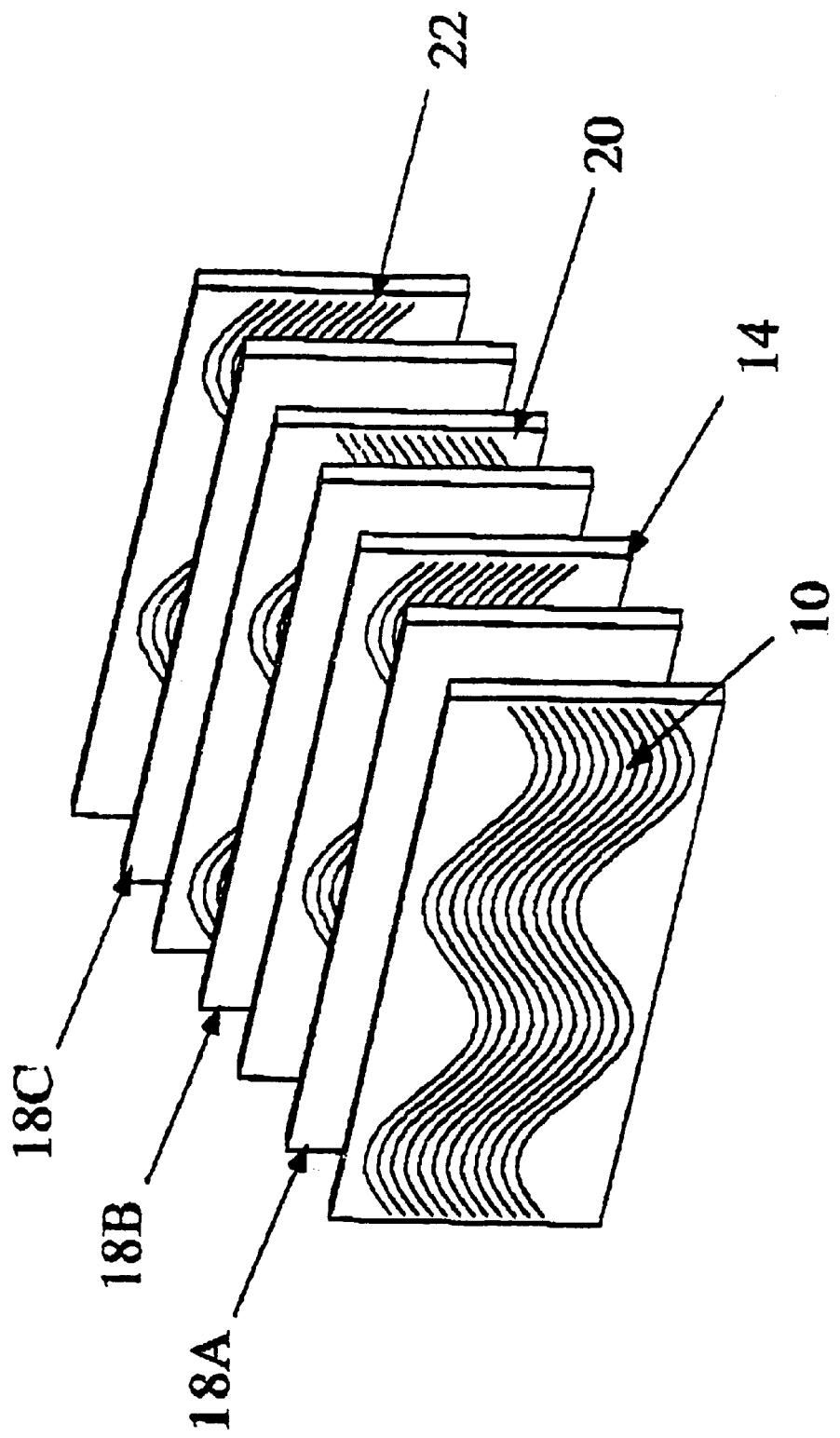
FIG. 5 is an exploded perspective view of a composite material according to yet another alternate embodiment of the present invention.

Additionally, it is also envisioned that the present invention may include a plurality of viscoelastic materials between CWC laminae. By way of example, FIG. 5 illustrates three viscoelastic materials 18A,18B,18C, which may be of the same or different compositions, interposed between CWC laminae 10,14,20,22.

In summary, a continuous wave fiber composite material according to the present invention may include one or more anisotropic composite layers with or without viscoelastic properties, and therefore respectively used without or with a separate viscoelastic layer. Of course, one may also utilize composite layers with viscoelastic properties (i.e., the viscoelastic material may comprise all or a part of the matrix material binding the fibers) and separate viscoelastic layers as well. Features of the pattern of reinforcing fibers may include:

A constant wavelength and/or waveform (see FIG. 1);

A wavelength and/or waveform that varies along the length of the structure (see FIG. 2);

A pattern in one CWC laminae having multiple wavelengths and/or waveforms (see FIG. 4); and Multiple combinations of CWC laminae and viscoelastic layers using one or more of the above features (see FIGS. 3 and 5).

In a further aspect of the present invention, an apparatus and method for manufacturing composite materials such as those described above are also envisioned.

Generally, characteristics of the processes and machines include:

laying the fiber(s) in a controlled pattern which can be periodic or non-periodic;

controlling the pattern with mechanical linkages such as (but not limited to) cams and levers, or by automated controls; and producing a fiber reinforced composite material consisting of matrices containing continuous fibers. The matrices can consist of conventional polymers, viscoelastic materials, or more exotic materials including (but not limited to) metal, ceramic, or combinations of materials. The fibers can consist of unidirectional tow or woven mats.

Figure 6A:
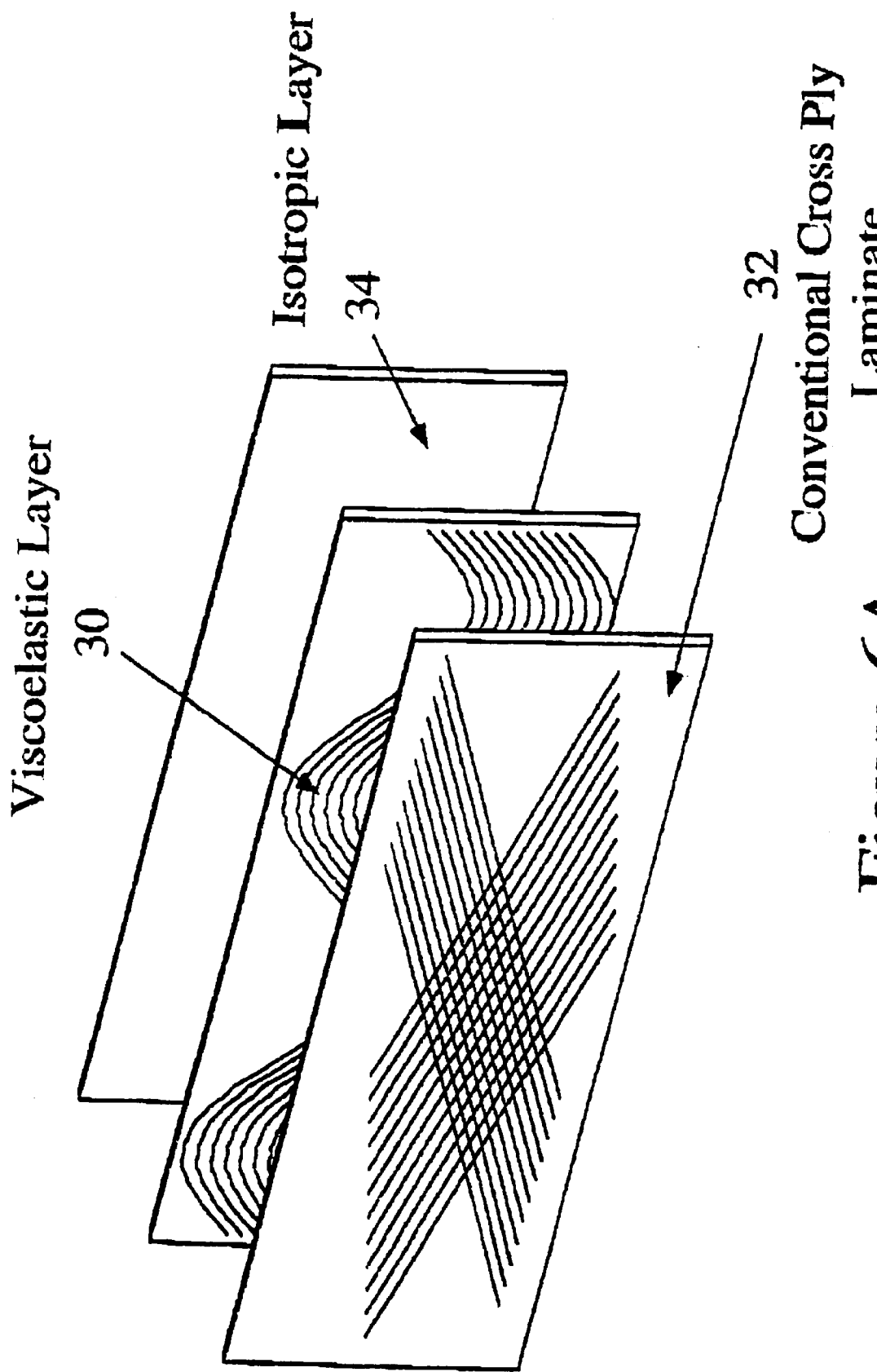
FIGS. 6A, 6B and 6C are exploded perspective view of a composite material and damping layer coupled to an isotropic layer in accordance with another embodiment of the invention.

In another embodiment of the CWCV structure, the use of CWC material with a separate viscoelastic layer or with CWC material which has an inherent viscoelastic property has a beneficial damping effect when used in conjunction with isotropic materials. One such structure utilizes a single viscoelastic layer 30 and a single CWC layer 32, as a constrained layer damping treatment to an isotropic structure 34 as shown in FIG. 6A. In FIG. 6A, the CWC viscoelastic layer 30 has a defined waveform, and is shown in the center of the structure with the CWC layer 32 in the form of a conventional cross-ply laminate placed on one side thereof. The two layers 30 and 32 are secured to the isotropic layer 34 on the other side of viscoelastic layer 30. The viscoelastic layer 30 may be a fiber-reinforced viscoelastic layer as shown. Most preferably, the fiber pattern of layer 30 may be continuous wave such as a sine wave and may have at least one of its period, amplitude or shape characteristic variable along the longitudinal length of the layer (such as the waveform shown in FIGS. 3 or 4). Isotropic layer 34 is generally part of or attached to a support structure. Layers 30 and 32 serve a damping function to dampen modes of vibration of the support structure, and in some cases can also serve a support function together with isotopic layer 34.

Figure 6B:
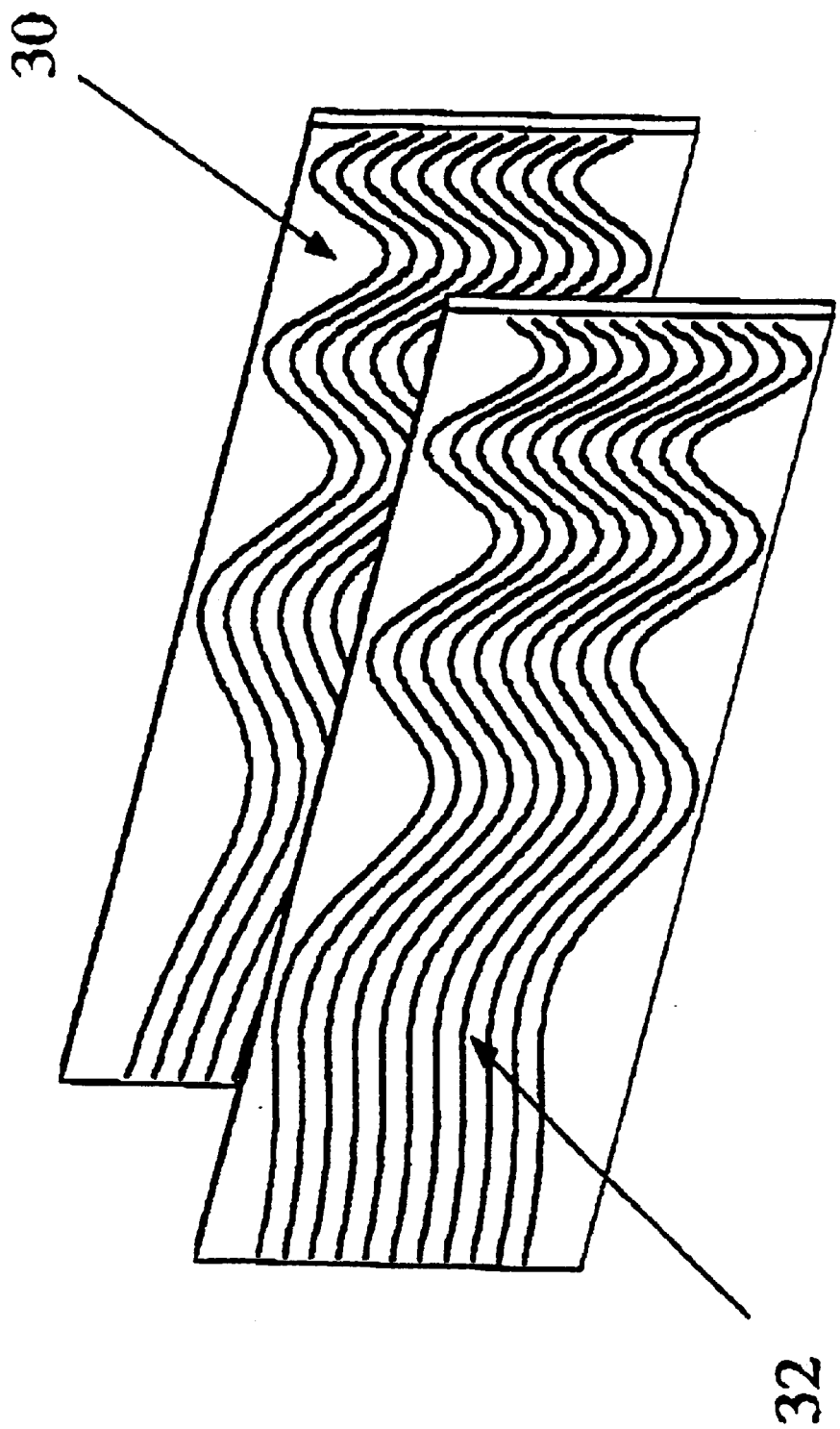
Figure 6C:
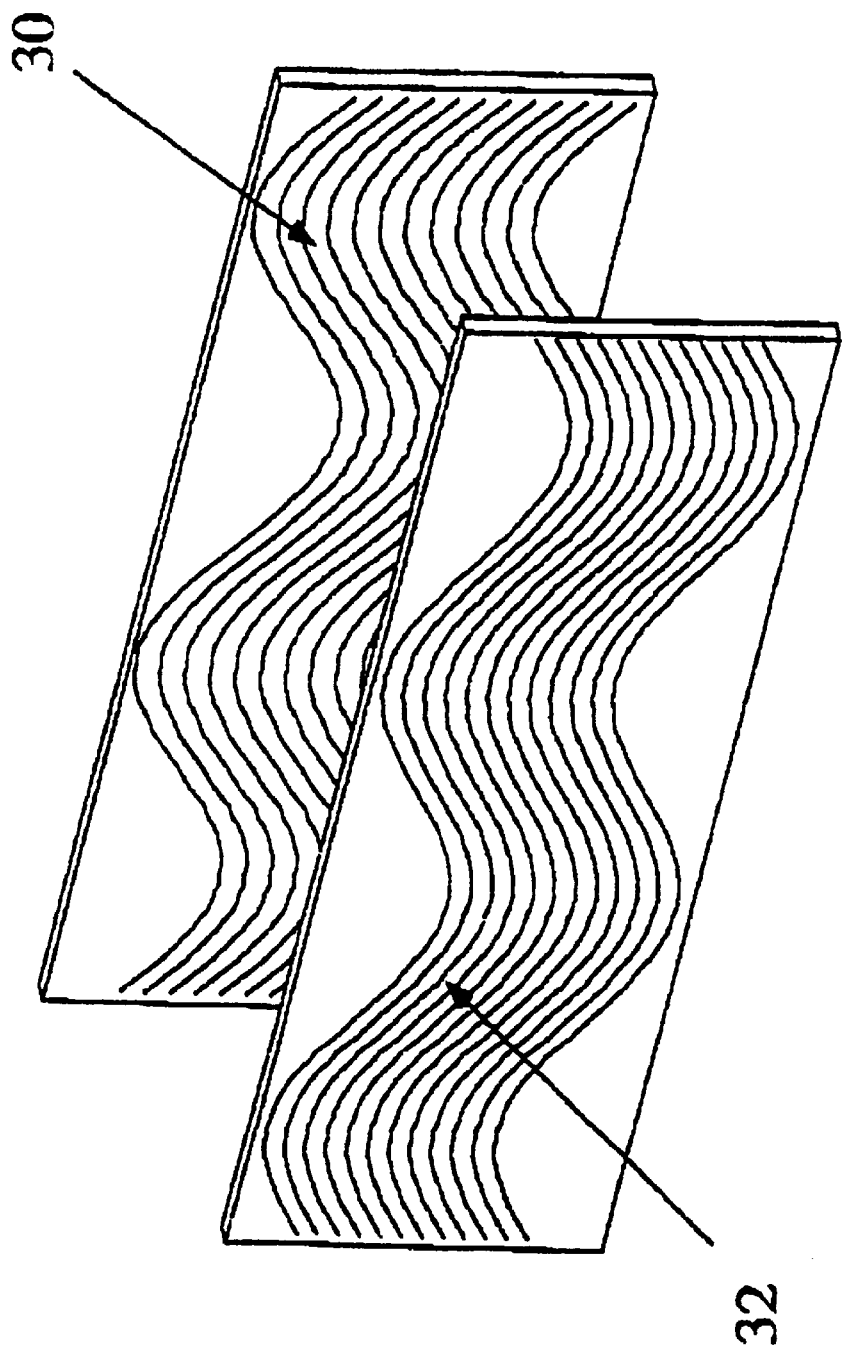

Many variations of FIG. 6A can be fabricated. For example, FIG. 6B illustrates layer 30 in the form of a variable wave period fiber pattern in a viscoelastic matrix. Layer 32 may then take the form of a variable wave period pattern in a conventional matix where the wave pattern is opposite (opposite phase) that of the viscoelastic matrix. FIG. 6C shown layer 30 in the form of a constant period wave pattern in a viscoelastic matrix and layer 32 in the form of a constant wave fibe pattern in a conventional matrix having opposite phase to that of FIG. 6B.

While both FIGS. 6B and 6C show that the waveforms in layers 30 and 32 are opposite one another, the opposite phase relationship, while desirable, may not be necessary in every application. The shape of the waveforms in layers 30 and 32 can vary individually in period and/or amplitude to take into effect desired damping characteristics. The waveforms may also be built from multiple wave periods with a first wave period selected to dampen a first vibrational mode of the support structure and the second wave period selected to dampen a second vibrational mode of the support structure. Third and additional wave periods may also be superimposed to dampen other modes or harmonics of vibration of the support structure or structures coupled to the support structure.

In other embodiments, additional layers of viscoelastic material may be used either between layers 30 and 32 or between layers 30 and 34.

The described combinations of fiber-polymer matrix and fiber-viscoelastic (anisotropic viscoelastic) materials may be used in structures as additional damping treatments or integrated into the structure at the time of construction to provide both damping and structural benefits.

The viscoelastic layer 30 of FIGS. 6A–6C may be fabricated using similar techniques as discussed below in connection with FIG. 7.

Generally, a typical arrangement which is coupled to a structure includes at least one layer or matrix with damping qualities (a layer of "anisotropic viscoelastic" properties) or at least one CWC layer and at least one viscoelastic layer. Each CWC or 'anisotropic viscoelastic' layer will include at least one reinforcing fiber. Such a structure would be used in conjunction with another CWC, or 'anisotropic viscoelastic', or isotropic layer."

An apparatus 100 for practicing an embodiment of a method of manufacturing continuous wave pre-preg materials is illustrated in FIG. 7. The basic process is described using polymer matrices containing carbon fibers for illustrative purposes and should not be construed as limiting the design or application of the machine. This example machine is capable of producing any number of different wavy patterns, combined patterns, and computer generated patterns optimized for a specific structure.

Continuous fibers 102 are fed into the machine 100 from a series of spools with tension adjusters (not shown). The fibers 102 are moved over rollers 104 to obtain a tow of fibers 102 uniformly spaced apart and flattened so as to have a uniform thickness. The uniform fiber tow is then pulled through a set of pinch rollers 106 which place sufficient compression on the tow to prevent lateral slippage of the fibers 102 when relative axially movement occurs between the pinch rollers 106 and a second set of pinch rollers 108. (In a prototype machine, pinch rollers 106 are held fixed to the machine frame, and pinch rollers 108 move axially along the rotation axis of the rollers 108; however, the rollers 108 could alternately be fixed with the rollers 106 movable axially. It is even possible to have both rollers 106 and 108 movable, as long as there is a net relative movement between the two. Further, in the prototype machine, the rollers 106 are rotated simply by the pull of the fiber therebetween).

The pinch rollers 106 may be made of metals, hard rubber, or metal with a thin compliant material coating depending on the characteristics of the fiber. For carbon fiber, metal rollers with a thin compliant coating are preferred to prevent chopping or breakage of the fibers 102.

The fibers 102 are pulled through the second set of pinch rollers 108 where one or more matrix materials 110 are combined with fibers 102. The matrix material may be in the form of rolled sheets carried by support rollers 111. FIG. 7 illustrates two paper sheets 110 (more generally "support sheets") being brought together to sandwich the fibers 102. In this example the paper sheets 110 have a thin coating of uncured polymer matrix which is thick and tacky at room temperature. The tackiness of the polymer matrix is sufficient to "lock" the fibers 102 in place at the moment of contact with the paper sheets 110 without the addition of heat or other chemicals. Use of other materials may require the addition of heat and/or chemicals to lock the fiber pattern into place.

The matrix containing the fibers is then passed through a series of cylinders 112 which causes complete commingling of the matrix material 110 and fibers 102, and/or curing of the material 110. In the example of the polymer matrix containing the carbon fiber tow, the cylinders 112 are heated enough to cause complete wicking of the matrix material 110 into the fibers 102, but not enough to cure the matrix material 110. The pre-preg material so produced may then be rolled up on a drum 114 and placed in a freezer until ready to use on a composite structure as is normal for other conventional composite materials. When the pre-preg material is to be used, it is thawed at room temperature, laid up or wrapped on the structure to be damped (with or without a viscoelastic layer) and cured in an oven with heat lamps, or the like.

Other materials (e.g. fibers and/or matrix) may require the addition of heat, controlled pressure, chemicals, or other processes to finish the production of the material, which could included shaping, curing, and/or cutting to final dimensions. The pre-preg material produced in accordance with FIG. 7 may also be used in the process of FIGS. 9–11 as described below.

A key to the manufacturing process is the differential movement of the two (or more) sets of rollers 106 and 108. For the example of carbon fibers in a polymer matrix, the enlarged portion of FIG. 7 shows how relative movement of the rollers 106,108 along their parallel axes of rotation introduces an angle θ of the fibers 102 with respect to the longitudinal advance of the matrix. The angle θ of the fiber tow may be set by computer control where the axial movement of the combination rollers 108 is tied algorithmically to the rotary movement of the combination pinch rollers 108. In a prototype machine, the rotary position of the combination pinch rollers 108 was used to compute its axial movement.

In the prototype machine, combination pinch rollers 106 was fixed against axial movement. The pinch rollers 106 apply sufficient compression force onto the fiber tow 102 to prevent axial slippage of the fiber tow 102 (relative to the pinch rollers 106) so that the fiber tow 102 is displaced at the continuously controlled angle θ relative to the combination pinch rollers 108 by axial movement of the combination pinch rollers 108.

There are a host of other ways to control relative movement of the pinch rollers 106,108 along their axes of rotation, including but not limited to cams, linkages, mechanical devices, and including various methods of sensing, position control, and computer control. In the example, computer control was used because it could be combined with optimization, drafting, analysis, design, and other computer programs, to create a concept-to-production capability.

Also illustrated in FIG. 7 is the manner of controlling the relative axial movement of the rollers 106 and 108. In general, any desired waveform for the fibers may be made using axial movement of any one or both of the pairs of pinch rollers 106,108. Thus, in the general case, drive mechanism 118 (such as a motor and appropriate gearing) and mechanical linkage 120 is provided to control the axial motion of the pair of rollers 106, it being understood that the upper and lower rollers of the pair of rollers 106 are mechanically linked to move together axially as well as rotationally. Similarly, a mechanical linkage 122 is coupled to drive mechanism 118 to control the axial motion of the pairs of rollers 108, it being likewise understood that the upper and lower rollers of the pair of rollers 108 are mechanically linked to move together axially as well as rotationally. In practice, it is only necessary to axially move one pair of pinch rollers 106,108 while keeping the other pair stationary. Thus, in the prototype apparatus, rollers 106 are fixed against axial movement (linkage 120 is not needed) while the drive mechanism 118 and mechanical linkage 122 is used to control the axial movement of rollers 108.

The rotational movement of rollers 106,108 may also be controlled by the control system described herein. For this purpose, a drive mechanism 140 is provided in the form of motors and appropriate mechanical linkages 142. Such systems are conventionally used in fabricating fibers aligned in the direction of travel (θ equals zero) of the fiber tow through the machine. In accordance with one aspect of the invention, however, the rotational velocity of rollers 106,108 is fixed, but, more generally, could be varied in cooperation with the relative axial movement of rollers 106,108 to produce the desired waveform of the tow. The rotary motor of the drive mechanism 140, may thus be responsive to a rotation control signal to vary the speed of rotation of the rollers.

It is noted that the rotary motion of the rollers 106,108 need not be controlled in the same manner. For example, rollers 108 can be rotated to pull the tow with roller 106 simply being rotated by the pull of the tow help tightly between the rollers 106 without any driving force to the rollers. Further, it is possible to control the rollers 106 to roll at a lower velocity from that of the rollers 108 to account for the angular variations imparted to the tow. It is even possible that the rollers 106 could be rotated in the counter direction of rotation of rollers 108 to maintain the tow taught while laying some high θ waveforms.

Control of the drive mechanism 118 and the mechanical linkage 120 is governed by a control system 130 which is generally an electronic controller and may comprise a programmed data processor or digital computer (e.g., microprocessor) having an input device 132 such as a keyboard. The control system 130 may be programmed to generate waveform control signals to the drive mechanism 118 to thus move the rollers 108 axially in such a manner that, when coupled to the known rotational speed of the rollers 106,108, produces a waveform having desired period, amplitude or shape characteristics. The waveforms shown in FIGS. 1–6 are examples of such waveforms. It is also possible to couple the axial motion of the rollers 108 to the rotational position of the rollers 108. For this purpose, a position sensor 134 is provided which generates pulses at regular angular intervals of the rollers 108. These position pulses are fed along lines 136 as an input to the control system 130 and used in the control algorithm to control the axial movement of the rollers 108. Alternatively, the control system may assume a fixed rotational speed of the rollers 108 as an input to the control algorithm.

As an example of implementing the above described control procedures, one may employ stepper motors and simple automated controls to place a waveform in the prepreg. The control of the machine was accomplished with the following algorithm and pseudo code, designed to produce a sine like wave. All comments are referenced to FIG. 7. The stepper motor employed in a prototype machine was a S83-93-MO stepper motor and the software employed was Compumotor's "Motion Architect v3.32" for the 6200 series controller. Other types of motor controls may be used including servo systems and the like.

Variable definitions:

$\theta_0$ is the maximum angle of the wave form;

$\theta$ is the angle at any given position;

L is the period of the half wave form;

$V_x$ is the constant feed speed of the rollers (108);

D is the perpendicular distance between pinch rollers (106 & 108);

$\Delta h$ is the step size of one coordinated move;

| | |
|---|---|
| $\Delta t = \dfrac{\Delta h}{V_x}$ | Calculated time for a given move |

Begin the wavy pattern compiled loop for both axis $X_{i+1} = X_i + \Delta h$

X(i+1) position

| | |
|---|---|
| $\theta = \theta_0 \cdot \text{Cos}\left(\dfrac{\pi \cdot x_{i+1}}{L}\right)$ | The angle calculation as a function of linear x-position of the feed rollers (108) for a simple sine wave of period 2L where the maximum angle is controlled. |
| $y_{i+1} = D \cdot \tan(\theta)$ | The calculated y(i + 1) position |
| $\Delta y = y_{i+1} - y_i$ | Delta y |
| $V_y = \left\|\dfrac{\Delta y}{\Delta t}\right\|$ | Compute absolute velocity |

$V_y$ the absolute velocity of the y-axis move $D(x_{i+1}, y_{i+1})$ Distance command $V(V_x, V_y)$ Velocity command It will be appreciated by those of skill in the art that many types of waveforms could be created using a similar method as described above. A fourier series expansion may be used to represent nearly any desired waveform and the computer may be programmed to output the new x,y position data (and $V_x$, $V_y$ velocity date) corresponding of the incremental changes in $\theta$.

As another example, the amplitude "y" shown in the right hand side of FIG. 4 may be represented by the formula:

$$y = Y(x)\left[A(x) * \sin\left(\frac{n\pi x}{L}\right) + B(x) * \sin\left(\frac{\pi x}{L}\right)\right]$$

The equation shows the general form where Y, A and B are functions of x, but in practice, some or all of these may be constants. Y(x) is used to control the maximum amplitude of the wave. In reference to the claims, variations in amplitude should thus be interpreted to be defined by variations in Y(x) and not Y. A(x) and B(x) are weighing factors to weigh the two different constituent waveforms.

The above formula may be used in a control system that specifies position. To set the angle of the fibers, the following formula may be used with the example controller (Compumotor series 6200) and substituted in place of the simple sine wave formula given above.

$$\theta = \theta_0 \cdot \left[A(x) * \cos\left(\frac{n \cdot \pi \cdot x_{i+1}}{L}\right) + B(x) * \text{Cos}\left(\frac{\pi \cdot x_{i+1}}{L}\right)\right]$$

The above formula represents the angle calculation as a function of linear x-position of the feed rollers (108) for a compound sine wave of period 2L/n superimposed on a wave of period 2L where the maximum angle $\theta_0$ is controlled. Again, A(x) and B(x) are weighting factors for the two different waveforms. The angle $\theta_0$ may also be a function of x. This equation above may be substituted for the equation shown in the example of the stepper motor algorithm and would produce a mixed waveform similar to the left hand side of FIG. 4. (In FIG. 4, A=0.2 and B=0.8).

Optimization of this wave form would be accomplished by varying the weight of each sine wave component, "n" the number of smaller waves, L the length of the larger wave period, and $\theta_0$ the maximum angle of the fiber lay. This could be done by an optimization routine or by a design-of-experiments (DOE). If done by an optimization program, the outputs (stiffness and damping) would be weighted based upon their relative importance and iterative calculations accomplished to determine the design space and optimal combinations of parameters. If the parameters are optimized by a design-of-experiments, levels would be chosen for each factor and a test matrix would be chosen to determine the optimal combinations. For example, one factor is the wave period of the larger wave (2L). The designer may chose three levels for L of 2, 3, and 4 (inches) so that a non-linear estimate could be obtained for the final optimized design. A good reference for designs-of-experiments may be found in *Taguchi Techniques for Quality Engineering*, by Phillip J Ross, McGraw-Hill Book Company, 1988, incorporated herein by reference.

As another example, the outermost waveform at the bottom of FIG. 3 may be represented by "y" in a control system that specifies position by using the following formula:

$$y = Y_0 * \sin\left(\frac{\pi x}{L - \frac{x}{A}}\right)$$

The formula shown above represents a constant amplitude as shown in the FIG. 3, where L is the wave period at the start and A is the wave period modifier. (In the more general case, both $Y_0$ and A may be functions of x). To determine the angle of a similar variable period wave where the maximum angle is held constant, the following formula would be used with the example controller (Compumotor series 6200) and substituted in place of the simple sine wave formula used in the first example.

$$\theta = \theta_0 \cdot \text{Cos}\left(\frac{\pi \cdot x_{i+1}}{L - \frac{x_{i+1}}{A}}\right)$$

The above equation shows the angle calculation as a function of linear x-position of the feed rollers (108) (FIG. 7) for a variable period sine wave of beginning period 2L modified by the factor A, where the maximum angle is controlled. In general, $\theta_0$ and A may be functions of x. Optimization of this wave form would vary the wave period (variable A), 'L the length of the beginning wave period, and $\theta_0$ the maximum angle of the fiber lay. This could be done by an optimization routine or by a design-of-experiments (DOE). If done by an optimization program, the outputs (stiffness and damping) would be weighted based upon their relative importance and iterative calculations accomplished to determine the design space and optimal combinations of parameters. If the parameters are optimized by a design-of-experiments, levels would be chosen for each factor and a test matrix would be chosen to determine the optimal combinations. For example, one factor is the wave period of the beginning wave (2L). The designer may chose three levels for A and three for L so that a non-linear estimate could be obtained for the final optimized design. Again the Ross text mentioned above is a good reference.

It is also envisioned that instead of individual fibers 102, a woven mat or fiber cloth may be used with the process and apparatus described in connection with FIG. 7. This would eliminate the need for the fiber arranging function performed by the rollers 104. Instead, the woven mat or fiber cloth would be unwound from a spool and directly passed through the pinch rollers 106. The pinch rollers 106 would keep the woven mat or fiber cloth from slipping and the side to side movement described above would produce a fiber pre-preg woven mat with a desired wave pattern.

The basic process described above may also be used with a fiber winding machine that is capable of placing a controlled fiber wave pattern on a structure in a continuous process. As described above, this machine also has the flexibility of producing any number of wave patterns tailored to the dynamics of a specific structure.

One of the beneficial aspects of the way CWC is made according to FIG. 7 is that the fiber volume fraction changes as a function of angle $\theta$. This results in a prepreg that increases its strength where the angle deviates from 0° unlike conventional prepregs. There are many composite structures with curved surfaces or that require abrupt changes in fiber direction that could benefit from stronger composite at the bends and thus utilize the invention as described herein.

It is known, for example, that the elastic moduli of unidirectional composites can be predicted from the properties and volume fractions of the constituents. See, S. W. Tsai and H. Thomas Hann, *Introduction to Composite Materials*, pp. 317–405, 1980, incorporated herein by reference. As an example, one such modulus important in prediction of bending and axial response is the equivalent modulus in the axial direction ($E_{11}$) of a tube which is a function of the angle and the various Young's modulii of the material. The effect of increasing volume fraction on the stiffness of the prepreg can be illustrated by showing its effect on the longitudinal Young's modulus $E_x$ (the modulus in the primary fiber direction but which is the main contribution to the equivalent modulus in the axial direction. See Tsai et al. p. 87. $E_x$ is given by:

$$E_x = v_f E_f + v_m \cdot E_m$$

$$v_f = \frac{Vol_{fiber}}{Vol_{total}}$$

$$v_m = \frac{Vol_{matrix}}{Vol_{total}}$$

However, in CWC prepreg materials, the volume fraction changes as a function of the angle:

$$Vol_{fiber} = \frac{Vol_{fiber\ at\ \theta}}{\text{Cos}\theta}$$

$$Vol_{total} = \frac{Vol_{fiber\ at\ \theta}}{\text{Cos}\theta} + Vol_{matrix}$$

Using typical values of carbon fiber and epoxy matrix, a 30° fiber angle would increase the longitudinal Young's modulus $E_x$ by about 7% and $E_{11}$ by about 5% for a 50% fiber volume fraction (at 0°) prepreg. As the 0° fiber volume fraction becomes greater, the modulus increases.

One possible use for CWC prepregs (without the use of viscoelastic layers) would be curved parts similar to elbows, where the lay of the fiber was designed to follow the general curve of the part. Another possibility is to use CWC prepregs in more conventional cross ply laminate lay-ups where differing patterns or offsets are used to give the structure unique qualities.

Resin pre-impregnated wavy pattern fiber composites fabricated according to the apparatus shown in FIG. 7 have the key characteristic that their fiber volume fraction changes as a function of the angle deviation from 0°. Such volume fraction changes also take place in woven fabrics with wave like forms. The key characteristic of all of these patterns is that they increase fiber volume as a function of the angle. Moreover, the volume fraction change is not limited to the use of carbon fibers or conventional resin matrix materials but extends to include metallic or other fibers and ceramic or sintered metal matrixes. Generally, the wave forms made in accordance with an embodiment of the invention may be characterized as any wave form which can be described by a polynomial series, fourier series, bezier, NURB (Non-Uniform Rational B-spline), periodic, non-periodic, random or pseudo-random method which has at least one continuous fiber and which has the key characteristic of changing fiber volume fraction.

The fact that we can "bend" the fibers in a prepreg has application and benefit outside of damping structures. For example, there are many small molded parts with bends and curvature which can be made much more easily and are stronger by using pieces cut from a continuous wave. One of the significant problems of molded composites is trying to get the fibers to "bend" around the curvature.

As an example, a composite wave form of the kind shown FIG. 8A may be made utilizing the apparatus of FIG. 7 for lay-up in a mold which requires a curve at the end. The prepreg with the pattern of FIG. 8A could be cut as shown in FIG. 8B, and the pieces used in molds to produce stronger curved members. A typical example that could benefit from this technology would be the ends of modern helicopter blades where the blade tips are swept back. Added strength at the critical bending region is provided by the increase in density where the fiber lay deviates from 0°.

Figure 9:
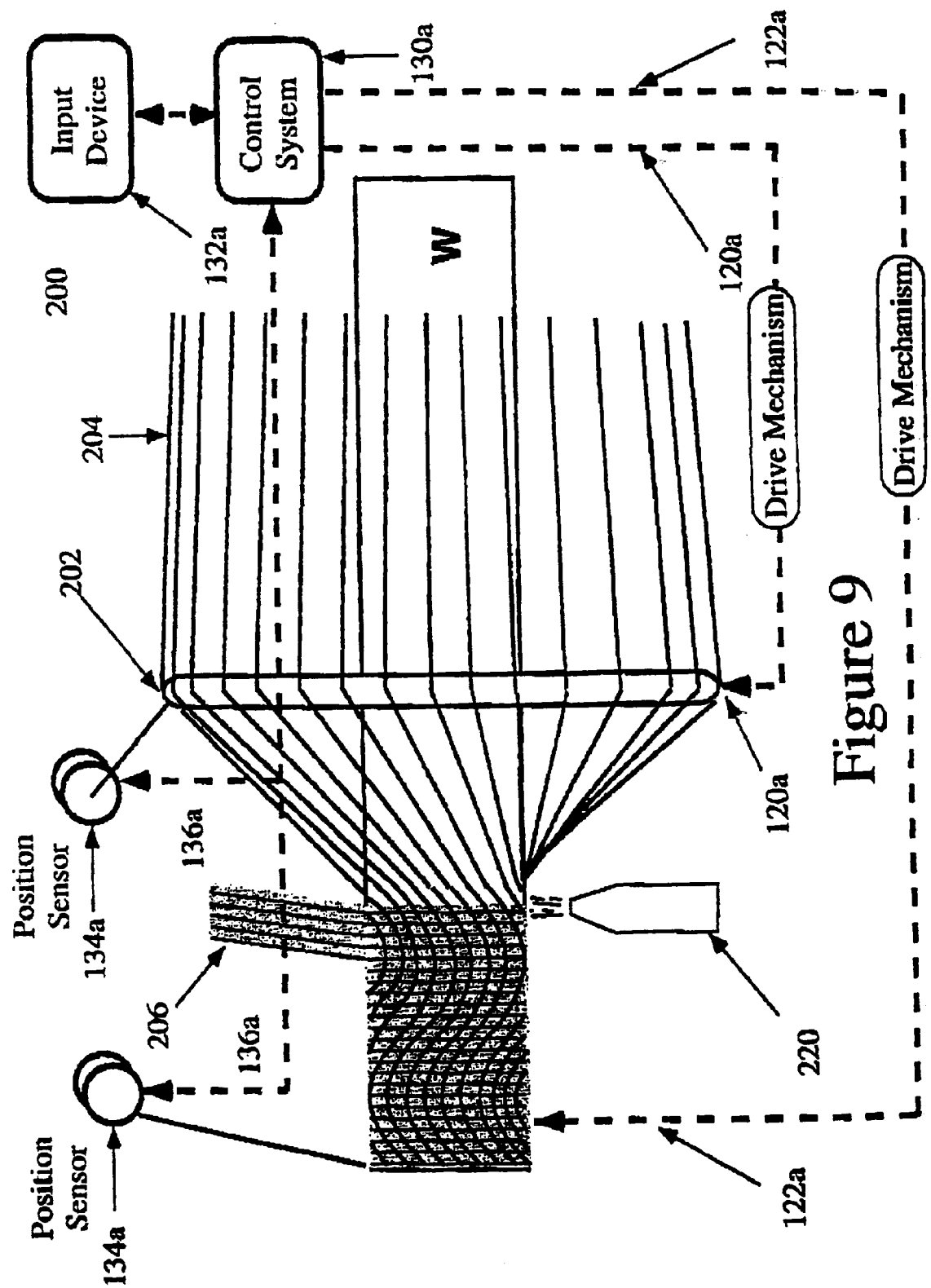
FIG. 9 is a schematic illustration of an alternate apparatus according to the present invention for manufacturing a composite material.

As shown in FIG. 9, a structure or workpiece W can be held stationary or fed into the machine 200. FIG. 9 illustrates a side view of the workpiece, and the workpiece itself may be of cylindrical or rectangular shape and is typically not rotated. A tow ring 202 is partially rotated back and forth around the workpiece W. For example, the tow ring 202 may rotate clockwise 20 degrees and then counter-clockwise 20 degrees as the workpiece moves from right to left in the figure. This procedure produces a sinewave pattern as shown. Alternately, the tow ring 202 may translate from left to right in the drawing to achieve the same relative translational movement. In yet another embodiment, the tow ring 202 can be stationary and the workpiece can rotate back and forth. In principle it is only necessary to provide a relative translational and rotational movement between the workpiece and the tow ring 202. Production of a wavy pattern directly on the workpiece enhances the strength of the workpiece.

As the workpiece W is fed into the machine 200 and the fiber tow 204 is positioned, fiber reinforced viscoelastic tape 206 is wound around the workpiece W to hold the fiber tow 204 in place with respect to the workpiece W. The fiber reinforcement in the wound viscoelastic tape 206 provides additional strength to the viscoelastic material to lock the fiber tow 204 in place. Alternately, in some applications, viscoelastic tape without the fiber reinforcement may be used to secure the fiber tow in place. While this example uses a "wet" or resin impregnated fiber tow 204, the process may also be performed with a dry fiber tow, i.e. a fiber tow without resin. In this case additional equipment, such as a spray nozzle 220, may be used to deposit a thin layer of resin in front of the viscoelastic tape 206.

Where dampening is desired, it is advantageous to utilize the viscoelastic tape (with or without the fiber reinforcements) as described.

In yet another embodiment, the viscoelastic tape may be omitted. In this case the wavy pattern needs to be fixed rather quickly after being laid down on the workpiece. To achieve this fixation, the resin may be cooled quickly upon contact with the fibers to thus harden and secure the fibers in place. Cooling may be achieved by cooling the workpiece itself or providing outside cooling to the area of contact between the resin and the fibers.

It is also possible to use a viscoelastic tape 206 that would also serve as the matrix for the fiber tow 204.

In the example given above, a completed workpiece W would be placed in an oven for curing as is normal for conventional composite materials. Other materials (e.g. fibers and/or matrix) may require the addition of heat, controlled pressure, chemicals, or other processes to finish the production of the material, which could included shaping, curing, and/or cutting to final dimensions.

In another embodiment, the relative motion between the workpiece and the tow ring 202 takes place in full circle (360 degrees). Thus, if the workpiece is stationary, the tow ring 202 continuously rotates in one direction around the workpiece. At the same time, the workpiece W is fed longitudinally into the machine 200 (from right to left in the FIG. 9). The rotary movement of the tow ring 202 is controlled by the advance of the workpiece W. The fibers are thus laid in a spiral pattern around the workpiece. A superimposed oscillatory movement (rotational velocity components in the clockwise and counter-clockwise directions) of the tow ring may then be used to produce a sine wave or other pattern as desired including a pattern varying in at least one of a period, amplitude or shape characteristic. As an example, if the tow ring is rotated at 30 RPM's clockwise, an additional variation of plus or minus 5 RPM's (varying sinusoidally in time) can be superimposed on the clockwise rotation to cause a sine wave superimposed on a spiral pattern. The fiber reinforced viscoelastic tape used in FIG. 9 may be fabricated using the apparatus shown in FIG. 7. Now, however, there need not be any relative movement between the rollers 106 and 108. Further, the matrix material 110 is now replaced with a viscoelastic tape such as "3M's" "ISD112" wound on the support rollers 111. This commercially available viscoelastic tape has a paper backing which is most preferably removed (but not necessarily removed) prior to application when used as the tape 206 in FIG. 9. While the "ISD112" is cured, it would be most preferably to use a tape having an uncured viscoelastic layer thereon so that subsequent heating of the tape viscoelastic material after wrapping as shown in FIG. 9 would cure the viscoelastic material and more completely secure the fibers therein. Further, while the fiber tow of tape 206 which is embedded within the viscoelastic material is shown in a straight line orientation with respect to the longitudinal direction of the tape, it is also advantageous to utilize a varying waveform tow such as a sine wave, and it is further advantageous to utilize a variable waveform varying in one of a period, amplitude or shape characteristic.

Since the apparatus of FIG. 7 may be used to embed fiber in either a resin or a viscoelastic material, the term "carrier" may be generically applied to describe the support structure carrying the fiber.

The control of rotation of the tow ring 202 and movement of the workpiece W may be achieved by means of input device 132a, control system 130a, mechanical linkages 120a, 122a and drive mechanisms as shown. Position sensors 134a connected to control system 130a along lines 136a may also be utilized in a similar manner as done in FIG. 7.

Figure 10:
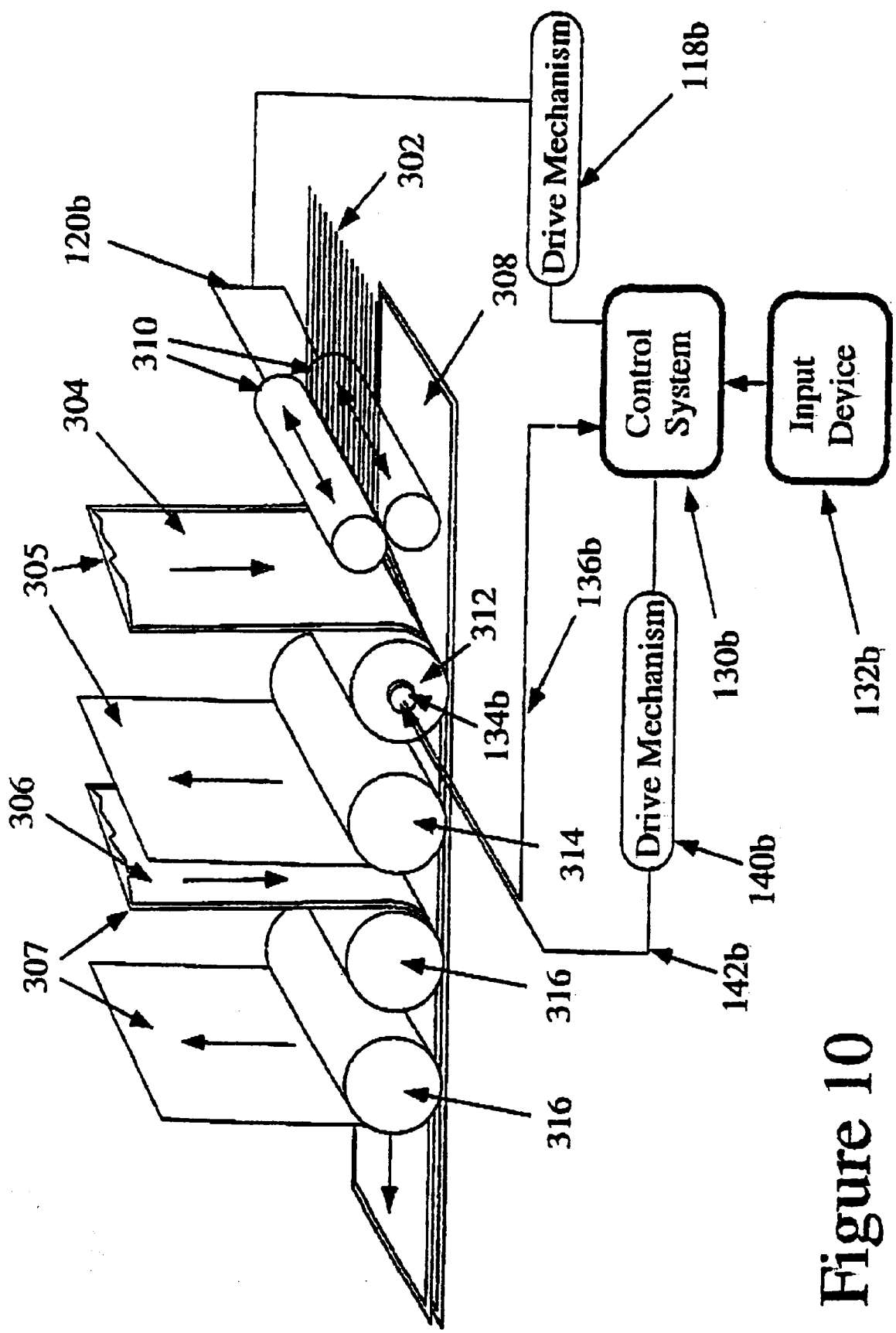
FIG. 10 is a schematic illustration of another alternate apparatus according to the present invention for manufacturing a composite material.

Another method for practicing an embodiment of the invention is shown in FIG. 10. A fiber tow 302, matrix material 304 and viscoelastic material 306 are laid over an existing fiber containing composite 308 such as the pre-preg made in accordance with FIG. 7. Alternately, instead of using a pre-preg as composite 308, one may utilize paper to serve as the initial substrate onto which the tow 302, matrix material 304 and viscoelastic material 306 are deposited. The substrate 308 may also be formed from a layer of viscoelastic material on a paper support. In the latter two example, the paper support is preferably later removed. In general, paper as used in this connection means any backing material which can be removed prior to or during use. In some cases, paper may be removed and a clear plastic backing placed thereon instead. In certain applications, the backing may be retained in place even on the final CWCV structure. Further, the substrate 308 may be formed from a previously made combination of fiber tow, resin and viscoelastic material made during a previous cycle through the fabrication steps shown in FIG. 10. In this manner, the output of FIG. 10 serves as the input to a second cell for performing the identical steps as illustrated in FIG. 10. The structure of the machine has been removed for clarity.

The continuous fiber tow 302 is fed into the machine from a series of spools with tension adjusters (not shown), and the fibers are uniformly arranged and flattened by rollers (not shown). The fiber tow 302 is then pulled through a set of pinch rollers 310 which place enough compression on the fiber tow 302 to prevent slippage of the fiber upon axial movement of the pinch rollers 310 for producing a fiber wave pattern. The pinch rollers 310 may be made of metals, hard rubber, or metal with a thin compliant material coating depending on the characteristics of the fiber. For carbon fiber, metal rollers with a thin compliant coating can be used to prevent chopping or breakage of the fiber.

The fiber tow 302 is combined with one or more matrix materials, such as a polymer matrix, coated, paper-backed sheet 304 as it is pulled over a second set of roller(s) 312. In the illustrated example, matrix coated paper sheet 304 is pressed down onto the fiber tow 302 by the roller 312. The matrix coated paper sheet 304 has a thin coating of uncured polymer matrix 304 which is thick and tacky at room temperature. In the illustrated example, the tackiness of the polymer matrix sheet 304 is sufficient to "lock" the fiber tow 302 in position upon contact without the addition of heat or other chemicals. Use of other materials may require the addition of heat and/or chemicals to lock the pattern into place.

The fiber containing matrix material (e.g., polymer, matrix coated, paper-backed sheet 304) is then passed under one or more rollers 314 which cause complete commingling of the matrix material and fiber tow 302. In the example using a polymer matrix containing a carbon fiber tow, the roller(s) 314 are heated enough to cause complete wicking of the matrix material into the fiber tow 302, but not enough to cure the material. Following this step in the process, the paper backing 305 is removed in preparation for laying another layer of viscoelastic material 306.

Next, a paper-backed layer of viscoelastic material 306 on a paper sheet 307 is laid on the fiber containing matrix, and paper backing 307 is removed by another set of rollers 316 which can be heated or cooled if necessary to promote adhesion.

FIG. 10 illustrates one "cell" of a larger machine of plural cells which lays multiple layers of fiber-matrix-viscoelastic combinations on a mold, panel, truss, or other large structure. It can also represent one cell of a continuous extrusion machine which, produces, shapes, and cures structural members.

In the embodiment of FIG. 10, the viscoelastic material and the resin are pressed together around the fiber tow so as to produce at least some co-mingling of the viscoelastic, matrix and fiber at the boundary of the matrix and the viscoelastic material.

Although a carbon fiber tow contained in a polymer matrix, and a viscoelastic adhesive have been used as an example, other materials (e.g. fibers and/or matrix) may require addition of heat, controlled pressure, chemicals, or other processes to finish the production of the material, including shaping, curing, and/or cutting to final dimensions.

Again, a key to the process is the differential movement of the two (or more) sets of rollers 310 and 312. In this example the orientation angle of the fiber tow 302 with respect to the direction of composite advance is set by computer control where the lateral movement of the fiber tow pinch rollers 310 is tied algorithmically to the rotary movement of the combination roller(s) 312. A similar or identical apparatus as described in connection with FIG. 7 may be employed in FIG. 10, and corresponding elements to FIG. 7 are labeled in FIG. 10 with a suffix "b" to indicate their correspondence. In FIG. 10, the axial movement of pinch rollers 310 are controlled by means of the control system with the roller 312 preferably remaining fixed against axial movement. As in FIG. 7, a rotational position sensor may be used to sense the rotation of roller 312 and the axial (transverse) movement of roller 310 may be adjusted to give the desired variable period, amplitude or shape to the waveform.

There are a host of ways to implement the mechanical/electrical controls including but not limited to cams, linkages, mechanical devices, and including various methods of sensing, position control, and computer control. In this example, computer control was used because it could be combined with optimization, drafting, analysis, design, and other computer programs, to create a concept-to-production capability.

Figure 11:
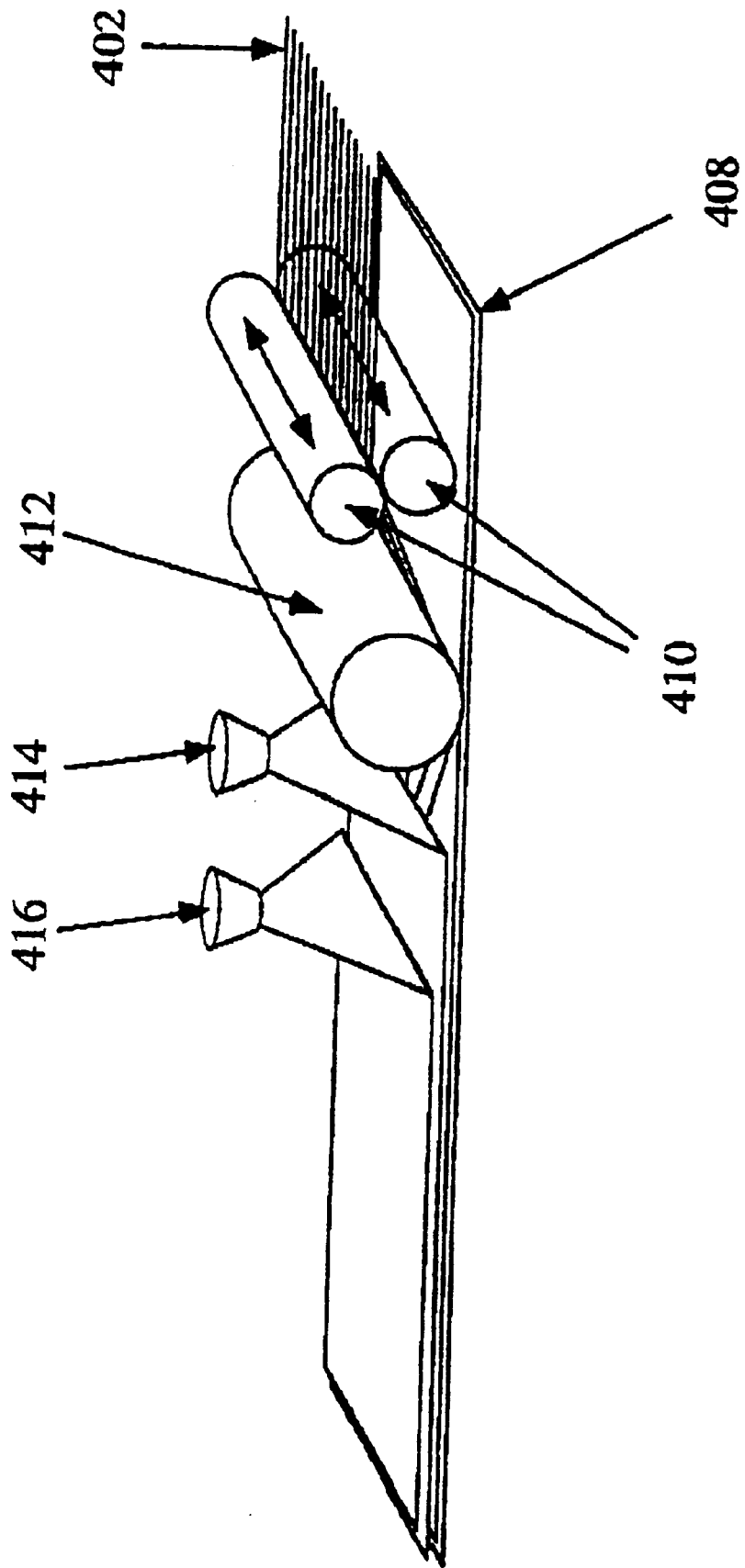
FIG. 11 is a schematic illustration of yet another alternate apparatus according to the present invention for manufacturing a composite material.

Yet another method for practicing an embodiment of the invention is shown in FIG. 11 which illustrates the steps of a composite machine that deposits thin layers of matrix and/or viscoelastic material using spray deposition methods.

As compared with FIG. 10, the rollers 314,316 used to deposit matrix 304 and viscoelastic material 306 are eliminated and replaced by sprayers 414 and 416, or other devices for depositing a thin layer of materials directly onto a fiber tow 402. FIG. 11 shows an example of laying a fiber tow 402 on a substrate 408 which may take the form of a previous laid viscoelastic adhesive layer. In the illustrated example, the fiber pattern of the fiber tow 402 is "locked" in as soon as the fiber tow 402 is forced onto the viscoelastic layer 408 by pressure roller 412. A heated resin matrix is then deposited by sprayer 414 onto the upper layer of fiber tow 402 to further lock the fiber pattern in place. Another layer of viscoelastic adhesive is then deposited by sprayer 416 on top of the resin matrix and the process is repeated.

Substrate 408 may also take the form of a composite of fiber, resin and viscoelastic material made from a previous use of the fabrication steps illustrated in FIG. 11. Alternately, the substrate 408 may be the pre-preg material of FIG. 7, a layer of viscoelastic material on a paper support, or just a form of paper to give support to the fiber tow, resin and viscoelastic material deposited thereon.

The use of heated resin matrix and viscoelastic adhesives are a practical means of "thinning" the mixtures to allow even deposition. As they cool, they become more tacky and help to hold the fiber patterns in place. However, chemical interaction between fiber (and any fiber coatings), matrix material, and/or viscoelastic materials could be used to accomplish the same purpose. These and any other methods which can be modified to deposit matrix and/or viscoelastic materials and lock the fiber pattern in place can produce any desired fiber pattern.

As shown in FIG. 11, a single layer of fiber, resin matrix, and viscoelastic adhesive were laid down on substrate 408 which may be formed from a previously made similar combination during a preceding similar process stage. It is also possible to lay different combinations of layers in like manner where different thickness and/or patterns of fiber and/or matrix and/or viscoelastic adhesive are desired. Using as an example a common resin matrix and viscoelastic adhesives, two fiber containing resin matrices could be laid down for every three layers of viscoelastic adhesives which are deposited. According to this example, FIG. 11 would be modified to illustrate an additional set of tow fibers 402, pinch rollers 410, pressure roller 412, and matrix sprayer 414 in tandem, followed by three viscoelastic adhesive sprayers 416.

As in the embodiment shown in FIG. 7, the embodiment of FIG. 11 may use a control system and mechanical linkage to axially move rollers 410 with roller 412 held stationary against axial movement. Thus, a similar or identical apparatus as described in connection with FIG. 7 may be employed in FIG. 11. In FIG. 11, the axial movement of pinch rollers 410 are controlled by means of the control system with the roller 412 remaining fixed against axial movement. As in FIG. 7, a rotational position sensor may be used to sense the rotation of roller 412 and the axial (transverse) movement of roller 410 may be adjusted to give the desired variable period, amplitude or shape to the waveform.

Figure 12:
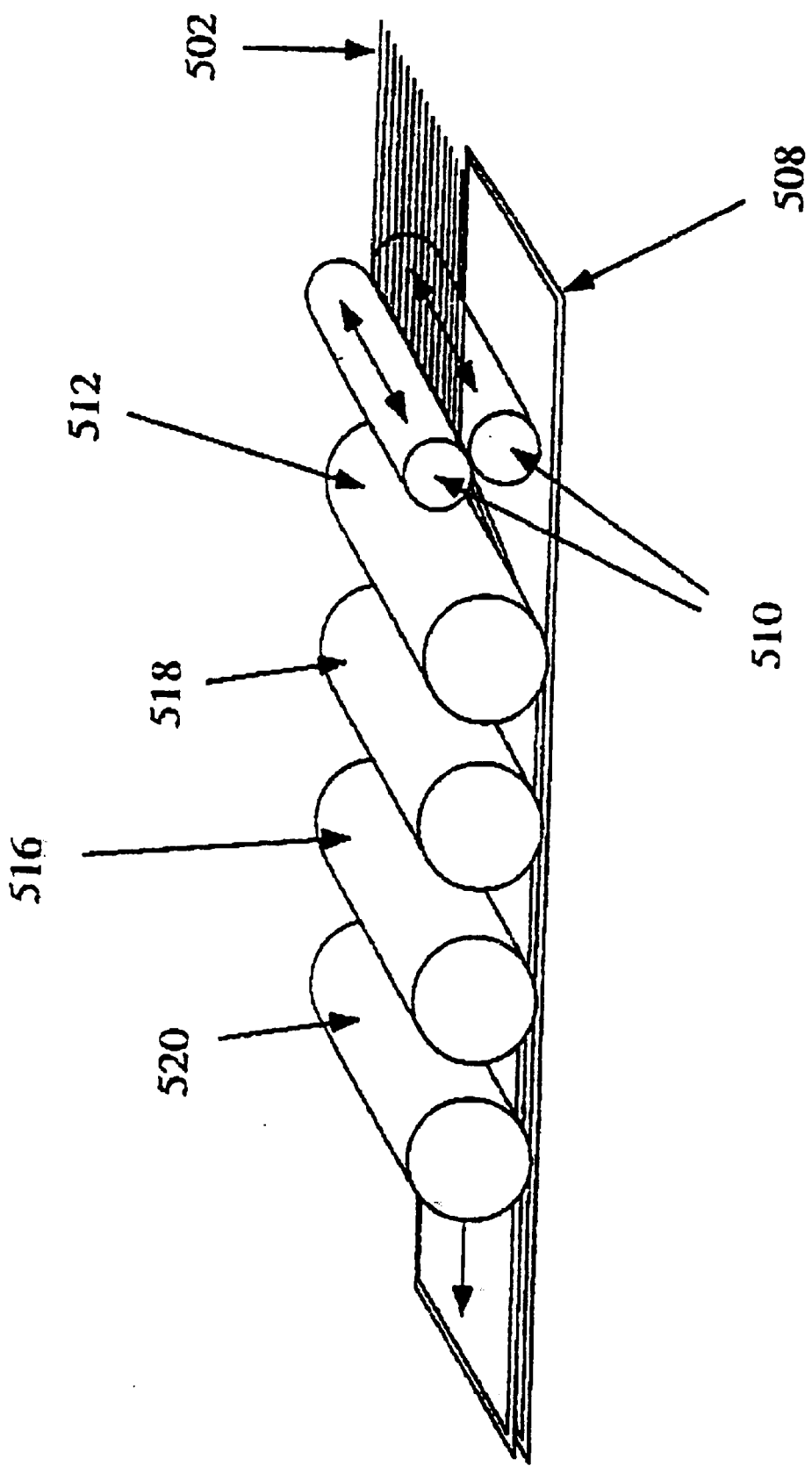
FIG. 12 is a schematic illustration of still another alternate apparatus according to the present invention for manufacturing a composite material.

FIG. 12 illustrates a method of practicing an embodiment of the invention in which a composite machine deposits thin layers of matrix and/or viscoelastic material using pressurized deposition methods (i.e., forcing resin through tiny holes in a cylinder). The extrusion machine shown in FIG. 10 may be modified as an example, but the concept is equally applicable to any of the above basic wave machines.

Instead of using paper coated with resin matrix or viscoelastic adhesive, rollers are used to deposit matrix and viscoelastic material in thin layers directly onto the fiber tow. As shown in FIG. 12, the fiber tow 502 axially moved by pinch rollers 510 so that a desired pattern or waveform is laid on a substrate 508. Substrate 508 may take the form of a previous made combination of fiber tow, resin and viscoelastic material; a layer of viscoelastic material on a paper support; a pre-preg; or simply a paper support. In the illustrated example, the pattern of the fiber tow 502 is "locked" in as soon as the fiber tow 502 is forced onto the substrate 508 by pressure roller 512. A heated resin matrix is then deposited onto the upper layer of fiber tow 502 through tiny holes in the pressure roller 512. A layer of viscoelastic adhesive is then deposited on top of the resin matrix by pressure roller 516. The process may be repeated by feeding the output (from roller 520) to another set of rollers identical to those shown in FIG. 12 with another input tow 502. The use of heated resin matrix and viscoelastic adhesives is a practical means of "thinning" the mixtures to allow even deposition. Cooling the resin matrix and viscoelastic adhesives may be expedited with optional cooling rollers 518 and 520. As the resin matrix and viscoelastic adhesives cool, they become more tacky and help to hold the fiber patterns in place. However, use of chemical interaction between fiber (and any fiber coatings), matrix material, and/or viscoelastic materials may also be used to accomplish the same purpose. These and any other methods which can be used to deposit matrix and/or viscoelastic materials and lock the fiber pattern in place will produce the desired pattern.

In the example illustrated in FIG. 12, a single layer of fiber, resin matrix, and viscoelastic adhesive were laid down on a previous laid similar combination. It is also possible to lay different combinations of layers in like manner where different thickness and/or patterns of fiber and/or matrix and/or viscoelastic adhesive are desired. As an example, using a common resin matrix and viscoelastic adhesives, two layers of fiber resin matrix could be laid down for every three layers of viscoelastic adhesive. According to this example, FIG. 12 would be modified to include an additional set of tow fibers 502, pinch rollers 510, and matrix pressure roller 512 in tandem followed by three viscoelastic adhesive rollers 516.

As in the embodiment shown in FIG. 7, the embodiment of FIG. 11 may use a control system and mechanical linkage to axially move rollers 410 with roller 412 held stationary against axial movement. Thus, a similar or identical apparatus as described in connection with FIG. 7 may be employed in FIG. 12. In FIG. 12, the axial movement of pinch rollers 510 are controlled by means of the control system with the roller 512 remaining fixed against axial movement. As in FIG. 7, a rotational position sensor may be used to sense the rotation of roller 512 and the axial (transverse) movement of roller 510 may be adjusted to give the desired variable period, amplitude or shape to the waveform.

FIGS. 9–11 may be modified to eliminate the application of the viscoelastic material and the resulting apparatus is suitable for making a pre-preg using only the apparatus associated with the fibers and the resinous material. For example, in FIG. 10, one merely needs to retain elements 310, 312, 314, 304 and 305 in order to make a resin matrix/fiber pre-preg. The starting material 308 in this embodiment of the invention could simply be a paper substrate. Similarly, in FIG. 11, one need only retain elements 408, 410, 402, 412 and 414 for fabrication of the pre-preg. In FIG. 12, only elements 508, 502, 510, and G512 need only be used. As in the case of FIG. 7, a paper substrate may be used for elements 408 and 508 of FIGS. 9 and 11 respectively.

In FIGS. 9–11, it is also generally possible to interchange the order of applying the resinous matrix and the viscoelastic material especially if there is some tackiness to the viscoelastic material so as to provide some resistance to movement of the waveform produced by the relatively axially movable rollers. In the event that the viscoelastic material is part of the resinous matrix, only a single application step is needed. In this latter case, the combined viscoelastic/resin matrix material is applied as a single step. Thus, in FIG. 10, element 304 would comprise a paper-backed viscoelastic/resin matrix material and elements 306, 316 and 307 would not be needed. Similarly, in FIG. 11 element 416 may be omitted (the spray of element 414 would contain both the viscoelastic and resin matrix material so that both are applied at the same time); and in FIG. 12 element 516 may be omitted as the viscoelastic material is applied together with the resin matrix using the single application roller 512.

Ideally, instead of using a separate viscoelastic layer, a CWC material with viscoelastic properties could be combined with another CWC (preferably but not necessarily with an opposite pattern) wherein the other CWC also preferably (but not necessarily) has viscoelastic properties. Such an arrangement would obviate the need for a separate viscoelastic layer or would at least permit any intermediate viscoelastic layer to be thinner. In the case that the adjacent CWC materials have viscoelastic properties, the "interface" layer between the adjacent laminae would have a thin layer of pure viscoelastic matrix naturally created during the curing process. Some current research indicates that stiffer or thinner viscoelastic layers would require much shorter wave periods.

It should further be noted that while the carbon fiber polymer type matrix is widely used and discussed above in connection with the various embodiments of the invention, one may also utilize metal matrix and ceramic base materials for high temperature applications without departing from the essential, features of the invention.

Additional advantages and modifications will readily occur to those skilled in the art. Therefore, the invention in its broader aspects is not limited to the specific details, and the representative devices, shown and described herein. Accordingly, various modifications may be made without departing from the spirit and scope of the general inventive concept as defined by the appended claims and their equivalents.

What is claimed is:

1. A method of fabricating an impregnated material comprising the steps of:
   a. passing a plurality of fibers to a first and second rollers said first and second rollers contacting said plurality of fibers therebetween for guiding same along a first direction,
   b. subsequently, passing said plurality of fibers to at least a third roller,
   c. transversely relatively moving at least one of (1) said first and second rollers and (2) said third roller in a second direction thereby moving said plurality of fibers generally perpendicular to said first direction, and d. utilizing said third roller for initially fixing said fibers to a carrier.

2. A method as recited in claim 1 wherein said initially fixing step comprises applying an uncured polymer matrix to said fibers as said fibers pass proximate said third roller.

3. A method as recited in claim 1 wherein said initially fixing step comprises applying a viscoelastic material to said fibers as said fibers pass proximate said third roller.

4. A method as recited in claim 1 wherein the step of transversely relatively moving comprises:

utilizing a controller to generate control signals according to a desired waveform for said fibers, feeding said control signals to a device for relatively moving said first and second rollers with respect to the third roller in said second direction to thereby cause the shape of said fibers to conform to said desired waveform.

5. A method as recited in claim 4 wherein said controller comprises an electronic controller and said control signals comprise electronic control signals which generate a waveform varying in at least one of a period, amplitude or shape characteristic.

6. A method as recited in claim 1, further comprising the step spraying a resinous material onto said fibers.

7. A method as recited in claim 1, wherein said step of initial fixing includes:

passing a support member carrying resinous material on at least one side of said fibers prior to said fibers making contact with said third roller to thereby impregnate said fibers with said resinous material, and subsequently separating said support member from said fibers.

8. A method of fabricating a material comprising the steps of:

a. passing a plurality of fibers to first and second rollers, said first and second rollers contacting said plurality of fibers therebetween for guiding same along a first direction, b. subsequently, passing said plurality of fibers to at least a third roller, c. transversely relatively moving at least one of (1) said first and second rollers and (2) said third roller in a second direction thereby moving said plurality of fibers generally perpendicular to said first direction, d. applying a resin matrix to said fibers at a point where said fibers pass immediately adjacent said third roller, and e. positioning a viscoelastic material at least adjacent said fibers.

9. A method as recited in claim 8 wherein said positioning said viscoelastic material includes commingling said viscoelastic material with said fibers.

10. A method as recited in claim 8 wherein said positioning step is performed after said resin matrix applying step.

11. A method as recited in claim 8 wherein said positioning step includes applying said viscoelastic material to said fibers at the same time as applying said resin matrix.

12. A method as recited in claim 8 wherein the step of transversely relatively moving comprises:

utilizing an electronic controller to generate control signals according to a desired waveform for said fibers, feeding said control signals to a device for relatively moving said first and second rollers with respect to the third roller in said second direction to thereby cause the shape of said fibers to conform to said desired waveform.

13. A method as recited in claim 12 wherein said electronic controller generates control signals corresponding to a waveform varying in at least one of a period, amplitude or shape characteristic.

* * * * *